(12) United States Patent
Nakamura et al.

(10) Patent No.: US 6,304,790 B1
(45) Date of Patent: Oct. 16, 2001

(54) SYSTEM DESIGN/EVALUATION CAD SYSTEM AND PROGRAM STORAGE MEDIUM

(75) Inventors: Takeo Nakamura; Eiko Kobuchi; Masato Ohtsuka, all of Kawasaki; Takashi Saitoh, Oyama; Yukiyasu Kobayashi, Oyama; Kenichi Kubota, Oyama, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/177,301

(22) Filed: Oct. 22, 1998

(30) Foreign Application Priority Data

Oct. 23, 1997 (JP) .................................................. 9-290773
Mar. 20, 1998 (JP) .................................................. 10-72920

(51) Int. Cl.$^7$ .................................................. G06F 19/00
(52) U.S. Cl. ............................ 700/97; 700/182; 345/964
(58) Field of Search .................................. 700/182, 121, 700/97, 86, 87, 18; 703/1, 2; 345/964, 967

(56) References Cited

U.S. PATENT DOCUMENTS

| | | | |
|---|---|---|---|
| 5,408,601 | * 4/1995 | Nakamura et al. | 345/347 |
| 5,517,607 | * 5/1996 | Nishimura et al. | 345/356 |
| 5,689,711 | * 11/1997 | Bardasz et al. | 717/1 |
| 5,748,943 | * 5/1998 | Kaepp et al. | 703/1 |
| 5,838,328 | * 11/1998 | Roller | 345/420 |
| 5,856,925 | * 1/1999 | Maeda et al. | 716/5 |
| 6,049,335 | * 4/2000 | Iida | 345/352 |

FOREIGN PATENT DOCUMENTS 1-310472   12/1989 (JP).
3-58278    3/1991 (JP).

* cited by examiner

Primary Examiner—Paul P. Gordon
Assistant Examiner—Zoila Cabrera
(74) Attorney, Agent, or Firm—Helfgott & Karas, P C

(57) ABSTRACT

In a CAD system, an electronic system is arranged by receiving an aid of a computer, and also a designing work of an architecture of this electronic system is carried out under the aid of the computer. An estimation with a high usability can be realized in high precision in an upstream stage, namely an earlier designating stage. The acquired design information is stored as know-how, and this stored know-how can be succeeded to the design information in a downstream stage. In this CAD system, a block diagram is edited by a block diagram input/editing unit, and this block diagram contains symbols indicative of independent functions, and lines used to connect these symbols. These symbols and lines are represented as the same design information. Both design information and parameter information may be applied to the symbols and the lines in a similar manner. Furthermore, the respective design information owns such a structure having a plurality of detailed level information with an architecture idea of a layer. The estimation parameter information to be applied to the symbols and the lines is prepared as templates in a parameter template holding unit. As a result, this template may prompt a user to input the necessary information.

13 Claims, 34 Drawing Sheets

```
if (TECH == 'YYY') {
    if ( Function == 'XXX')]
        SIZE = ( Bit+α)*β+γ
        SIZE-ERR = Bit*X
        POWER = (SIZE*Y)+θ
}
else if ( ) {
    ⋮
}
```

FIG. 10
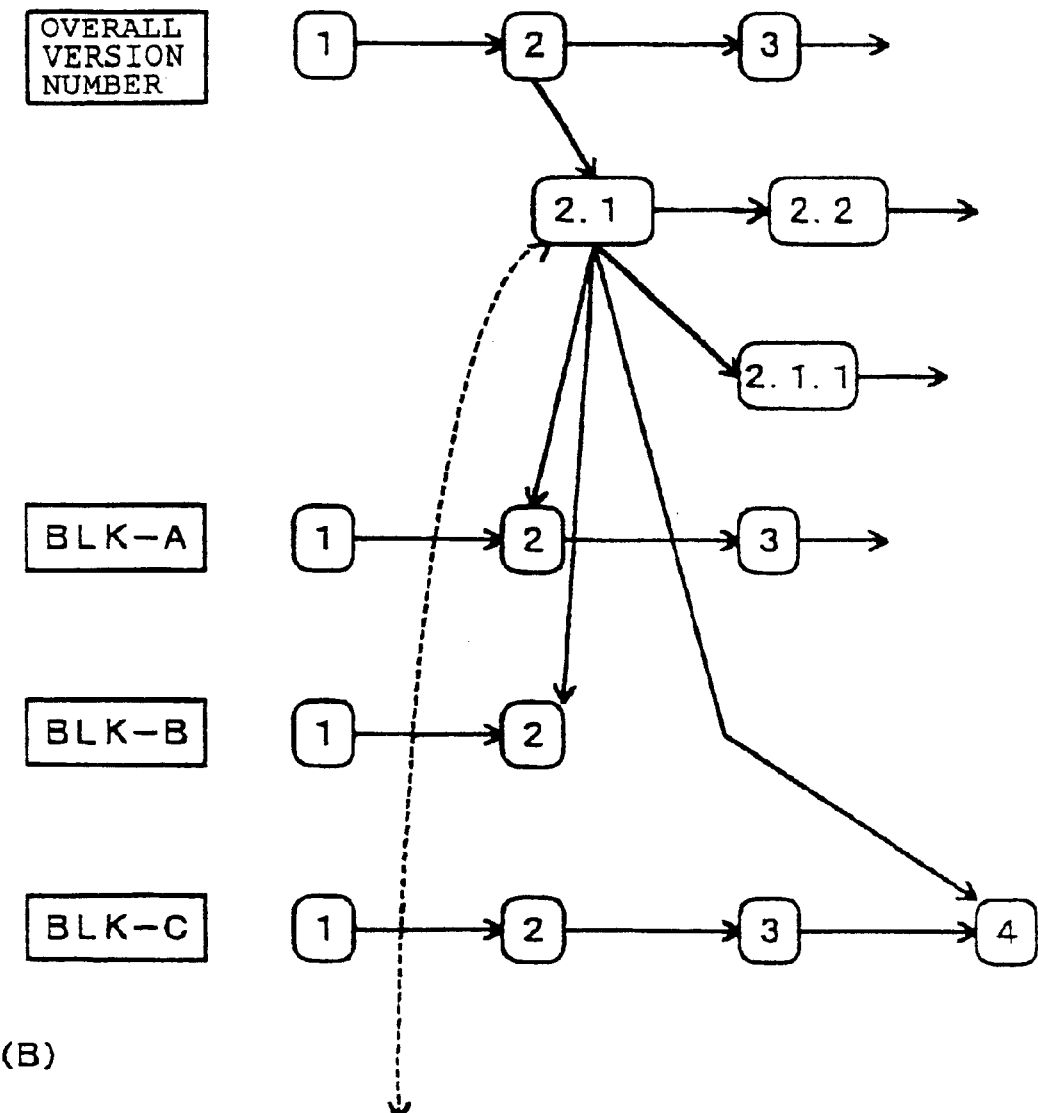
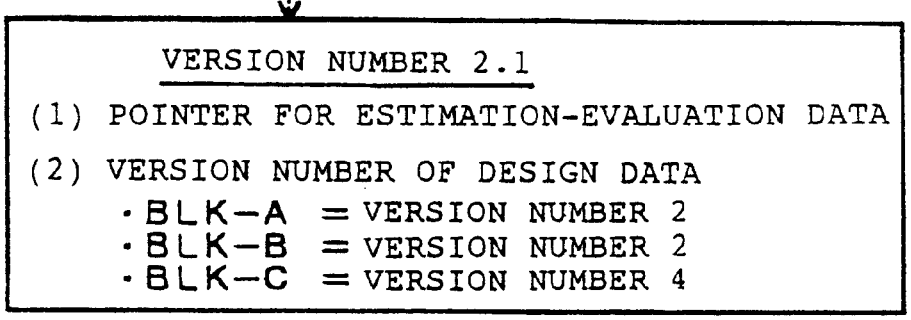

FIG. 14

```
//***Parameter List      ------------------------------------

//PropType means Used-property C:Common or U:Uniq
  Module    Architecture ModuleID PropType Property      Value
  C_MODULE  SIMPLE_ARCHI AC01     C        MODULE_TYPE   LOGIC
                                  C        FF_NUM        300
                                  C        GATE_RATE     35
                                  C        GATE_BC       8000
                                  C        GATE_AREA     12000
                                  C        ACTIVE_RATE   30
  D_MODULE  SIMPLE_ARCHI CC03     C        MODULE_TYPE   LOGIC
                                  C        FF_NUM        100
                                  C        GATE_RATE     20
                                  C        GATE_BC       5000
                                  C        GATE_AREA     8000
                                  C        ACTIVE_RATE   28
  C2_MODULE SIMPLE_ARCHI CC02     C        MODULE_TYPE   RAM
                                  C        MEMORY_TYPE   single
                                  C        BIT           32
                                  C        WORD          256
                                  C        COLUMN        4
  A1_MACRO  SIMPLE_ARCHI CC01     U        MODULE_TYPE   LOGIC
                                  U        CLEAR         0
                                  U        LOAD          0
                                  U        BIT           16
  B_MODULE  SIMPLE_ARCHI AB01     C        MODULE_TYPE   ROM
                                  C        FREQUENCY_MHz 40
                                  C        BIT           64
                                  C        WORD          1024
                                  C        COLUMN        16
```

FIG. 16

```
//***Estimation Condition-----------------------------------------------------
//ERL:/home/ARCHICAD/TestDB/erl/CE61.erl Vendor:FJ Version:1 LastUpdate:7/25/1997 Comment:TestVersion
Property          Value
TEMP_AROUND_MAX   35
WIND              0m/s(multi)
VOLTAGE           3.3
SCAN_FF           Yes
POWER_TYPE        single
FREQUENCY_MHz     80
PACKAGE           FPT-64P-M06
SERIES            CE61F10
//***End of Estimation Condition---------------------------------------------
```

FIG. 18
(A)
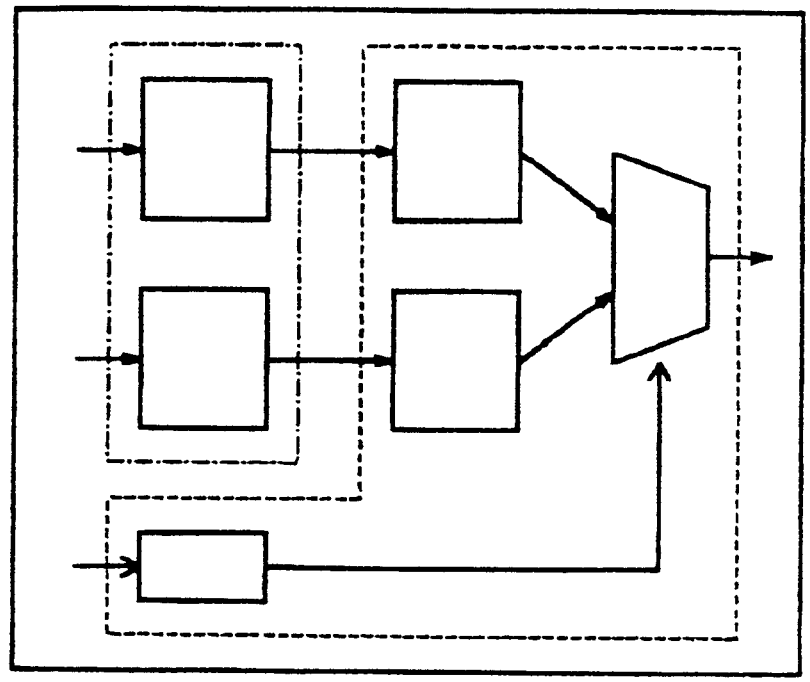
(B)
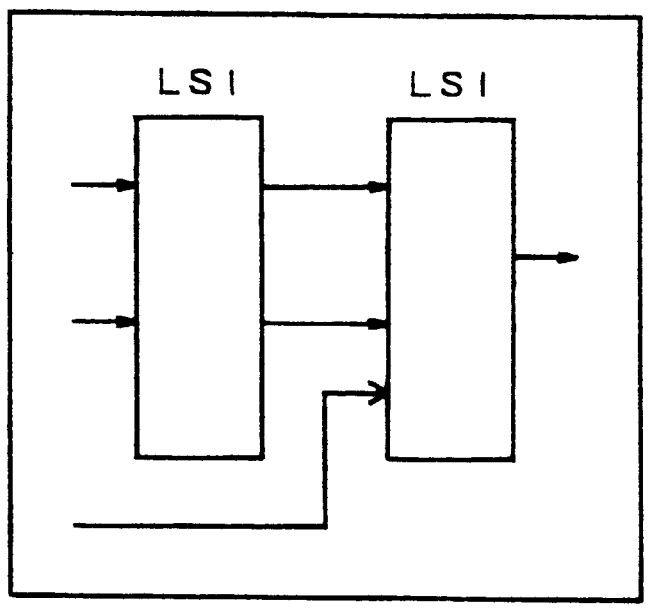

FIG. 20

(A)
```
//***Result by Module

//{M:Module Data, S:Children SDM)
Module      Architecture  ModuleID  Body   Type  Size[BC         Area ]         PinNo  POWER
C_MODULE    SIMPLE_ARCHI  AC01      BLOCK  LSI   18561   (S)     22861  (S)     -      0.13  (S)
  D_MODULE  SIMPLE_ARCHI  CC03      VHDL   LSI    6000   (M)      9200  (M)     -      0.09  (M)
  C2_MODULE SIMPLE_ARCHI  CC02      -      LSI    9061   (M)      9061  (M)     -      0.04  (M)
    A1_MACRO SIMPLE_ARCHI CC01      -      LSI    3500   (M)      4600  (M)     -      0.00  (M)
B_MODULE    SIMPLE_ARCHI  AB01      -      LSI    8573   (M)      8573  (M)     -      0.02  (M)
A_MODULE    SIMPLE_ARCHI  AA01      BLOCK  LSI    9500   (S)     13800  (S)     -      0.09  (S)
  D_MODULE  SIMPLE_ARCHI  A201      -      LSI    6000   (M)      9200  (M)     -      0.09  (M)
  A1_MACRO  SIMPLE_ARCHI  A101      -      LSI    3500   (M)      4600  (M)     -      0.01  (M)

//***End of Result by Module
```

(B)
```
//***Summary

//Result by System
Size(BC  Area ]   PinNo  POWER   Tj
 36634   45234      49    0.25   50

//Chip Capacity by Lsi Series
Series   TotalBC   UseBC    MaxPinNo  Capacity:BC%  Area%  Pin%
CE61E71  1583808   1176258     506         3          3      9
CE61E59  1148840    849604     472         4          5     10
CE61E45   576291                                 6     7     10
CE61F     ^3750                              8
```

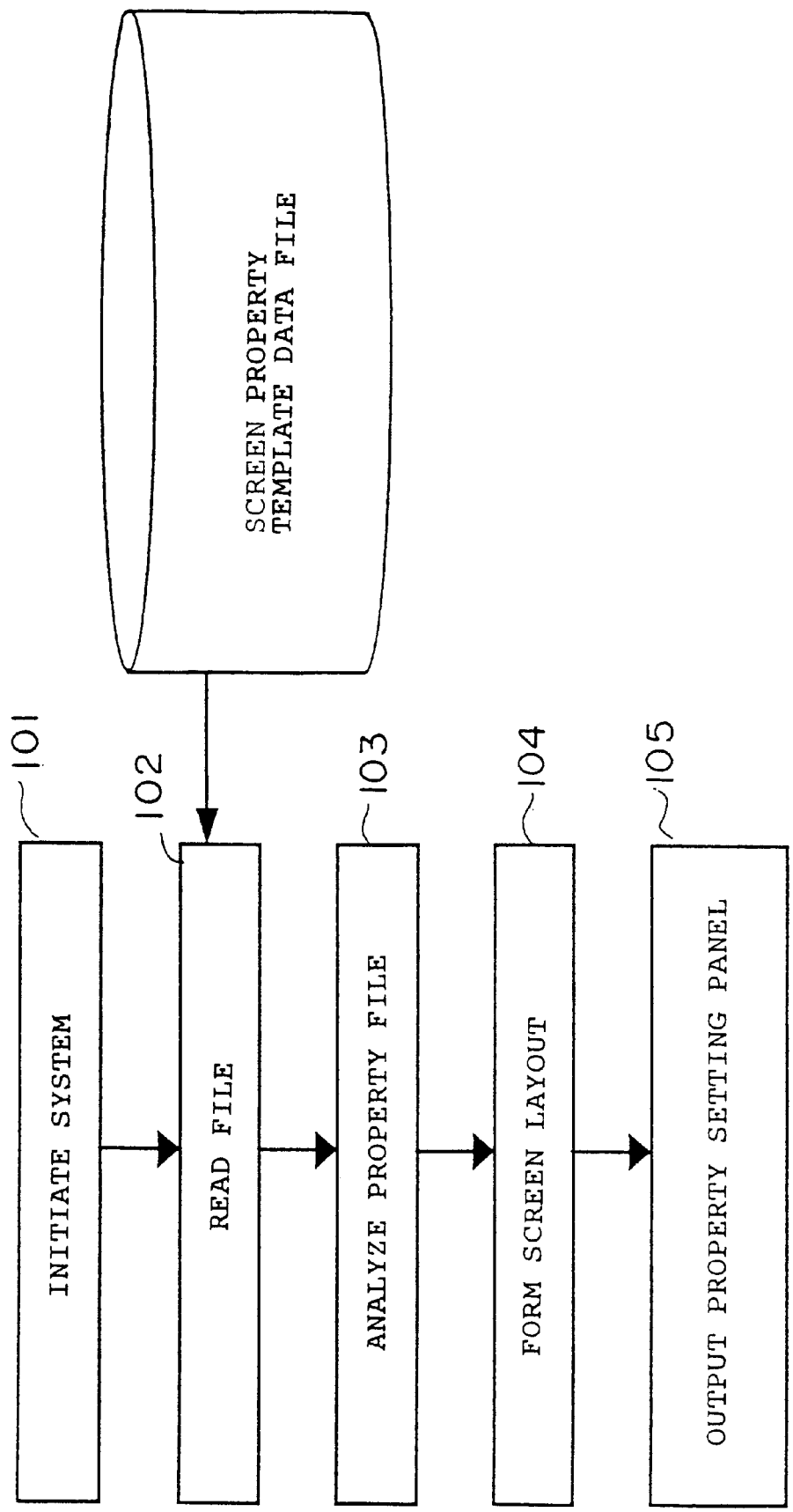

FIG. 26

```
# Property Template File (PTF)  Define Sample
SYSTEM:
TECHNOLOGY : INPUT S30 MENU(%DICT) :      #TECHNOLOGY
#----------------------------------------------------------------
SYMBOL:
INSTANCE : INPUT S128 DEF(%AUTO) , DISPLAY AL LU 0 10 GREEN ; #SPECIFIC NAME
PARTS    : INPUT S20 , DISPLAY AL LU 0 40 YELLOW ;   #CORRESPONDING
END;                                                  COMPONENT (MPU,ETC)
#----------------------------------------------------------------
SIGNAL:
TYPE      : INPUT S30 MENU(%DICT) , DISPLAY SW CP 0 10 YELLOW ;
INTERFACE : FILE DIR(%IFPATH) TYPE(i) ;
END;
#----------------------------------------------------------------
MODULE:
SIZE_BC  : INPUT F12 MIN(1) ;
COST     : INPUT D10 MIN(1) ;
END;
#----------------------------------------------------------------
INTERFACE:
WIRE_NO         : INPUT D4 MIN(1) UPDOWN ;
HIGHT_SPEED_WIRE : INPUT D4 MAX(WIRE_NO) UPDOWN ;
END;
#-- END OF FILE ------------------------------------------------
```

— PRESENT WAYS —

- FREELY DEFINE BLOCK ON EDITING SCREEN
- BLOCK TEMPLATE IS PRESENT
- NO DEFINITION OF PIN IS REQUIRED BY CONNECTING LINE
- LINKED TO LOWER-LEVEL HIERARCHY BY APPLYING ATTRIBUTE

- DESIGNING WITHOUT LIBRARY
- FREELY SETTING NAME/ATTRIBUTE

SYSTEM DESIGN/EVALUATION CAD SYSTEM AND PROGRAM STORAGE MEDIUM

BACKGROUND OF THE INVENTION

The present invention generally relates to a CAD (computer aided design) system for aiding a system designing of an electronic apparatus. More specifically, the present invention is directed to a system design/evaluation CAD system capable of optimizing an overall designing of an electronic apparatus, capable of improving designing qualities, and also capable of effectively performing a system designing, while being used in a design phase for considering a specification of such an electronic apparatus and an architecture. Furthermore, the present invention is related to a program storage medium capable of storing a program of such a system design/evaluation CAD system.

Conventionally, when physically realizable scales and power consumption of LSIs and printed circuit boards (PCBs), which constitute electronic apparatuses in earlier stages for designing these electronic apparatuses, namely in considering stages of specifications and architectures, physically realizable scales of respective structural elements are estimated on desk works while considering similar functions of the electronic apparatuses, PCBs, and LSIs which have been designed in past. Then, a calculation is made of scales when these structural elements are employed to assemble the final electronic apparatus. As a result, these estimations are largely influenced by experiences by designers.

In this case, physical parameters to be estimated are given as follows: There are gate counts (areas) and pin counts used to input/output of chips, power consumption of chips, delays (cycle numbers) in LSIs and FPGAs. Also, there are package areas when chips are mounted on PCB, total numbers of components mounted on PCBs, and a total number of connector pins which constitute inputs/outputs of PCBs. Also, cost information about the respective components may constitute estimation parameters.

For instance, while using a block diagram as shown in FIG. 21, functional arrangements of an apparatus are considered. As to boxes (symbols) corresponding to the respective blocks indicative of one function, multiplications are made of the above-explained physical parameters as estimation values, and the multiplied estimation values are collected. A hierarchical process is carried out in such a manner that a content of one box (symbol) in a block diagram is made further detailed, and the detailed box content is represented by a similar block diagram. In this case, also in a lower-graded hierarchy, the following method may be realized. That is, an estimation is made as to each of boxes, and then the estimated results are stacked on an upper-graded box.

Apparently, if the boxes (symbols), the respective functions of which have been designed in the past, are diverted, then the correct estimation result can be obtained from this information.

In an initial considering stage of designing an apparatus, physical feasibilities (total number of components, dimensions, heat, etc.) and cost in addition to functions/performance of this apparatus may constitute important considering elements. Also, optimum designs must be confirmed with a large number of patterns while changing an architecture of the apparatus, and a subdividing method of an LSI and a PCB.

In a conventional designing method, a block diagram shown in FIG. 36 is drawn, a parameter value of each block is estimated, and then these estimated parameter values are collected in a manual manner, or by using table calculation software.

As previously explained, in the conventional method, the respective blocks are estimated based upon experiences and intuition of the apparatus designers, and then the estimated blocks are built up. As a result, the conventional designing method owns the following problems:

1) Since the estimations are carried out based on the individual experiences of the designers, the estimation precision involves differences caused by individual designers.
2) Since the design/estimation know-how is reserved in the individual designer, this know-how cannot be stored as commonly available information.
3) In the case that the arrangement of the electronic apparatus is designed in a so-called "cut and try" manner, cumbersome/similar calculations must be repeatedly performed, which requires lengthy time, and also which involves calculation mistakes.
4) The objective evaluation can be hardly made such that the calculated apparatus arrangement and the calculated architecture constitute optimum solutions.
5) The design information such as the apparatus structural block diagrams formed in the specification studying stage could not be effectively utilized in the subsequent designing process. Accordingly, this formed design information is reentered to the CAD system in the downstream stage.

The present invention has been made to solve the above-explained problems, and therefore, has an object to provide a means capable of aiding by a computer, a system designing stage corresponding to an upstream stage of an apparatus designing process.

SUMMARY OF THE INVENTION

A CAD system, according to an aspect of the present invention, is featured by such a system designing/evaluating CAD system for aiding a system design by way of a computer, comprising: means for editing a block diagram containing symbols representative of an independent function, and lines for connecting these symbols with each other; means for setting design information to the symbols and the lines in the same formats, respectively, and means for storing thereinto design information in such a data structure that each of the set design information can hold a plurality of detailed level information for each level of layer.

As a consequence, the symbols and the lines can be handled as similar modules. Also, there is such an effect that the block diagram input/editing system capable of handling a plurality of abstract levels can be realized.

BRIEF DESCRIPTION OF THE DRAWINGS

A more complete understanding of the present invention may be made by reading a detailed description in conjunction with the accompanying drawings:

FIG. 10 is an explanatory diagram for explaining a relationship between a storage of estimation/evaluation data and a designing version number;

FIG. 14 is a diagram for representing an example of parameter information given to the respective blocks;

FIG. 16 represents a concrete example of the estimation/evaluation condition;

FIG. 18 is a diagram for showing an example of cut out to a physical layer;

FIG. 20 is a diagram for indicating a concrete example of an estimation/evaluation result;

FIG. 25 is a flow chart for describing a sequential operation of setting a property;

FIG. 26 is a diagram for showing an example of an external template definition;

DETAILED DESCRIPTION OF THE PREFERRED EMBODIMENTS

Before describing concrete preferred embodiments of the present invention, a basic idea of the present invention will now be explained.

Figure 1:
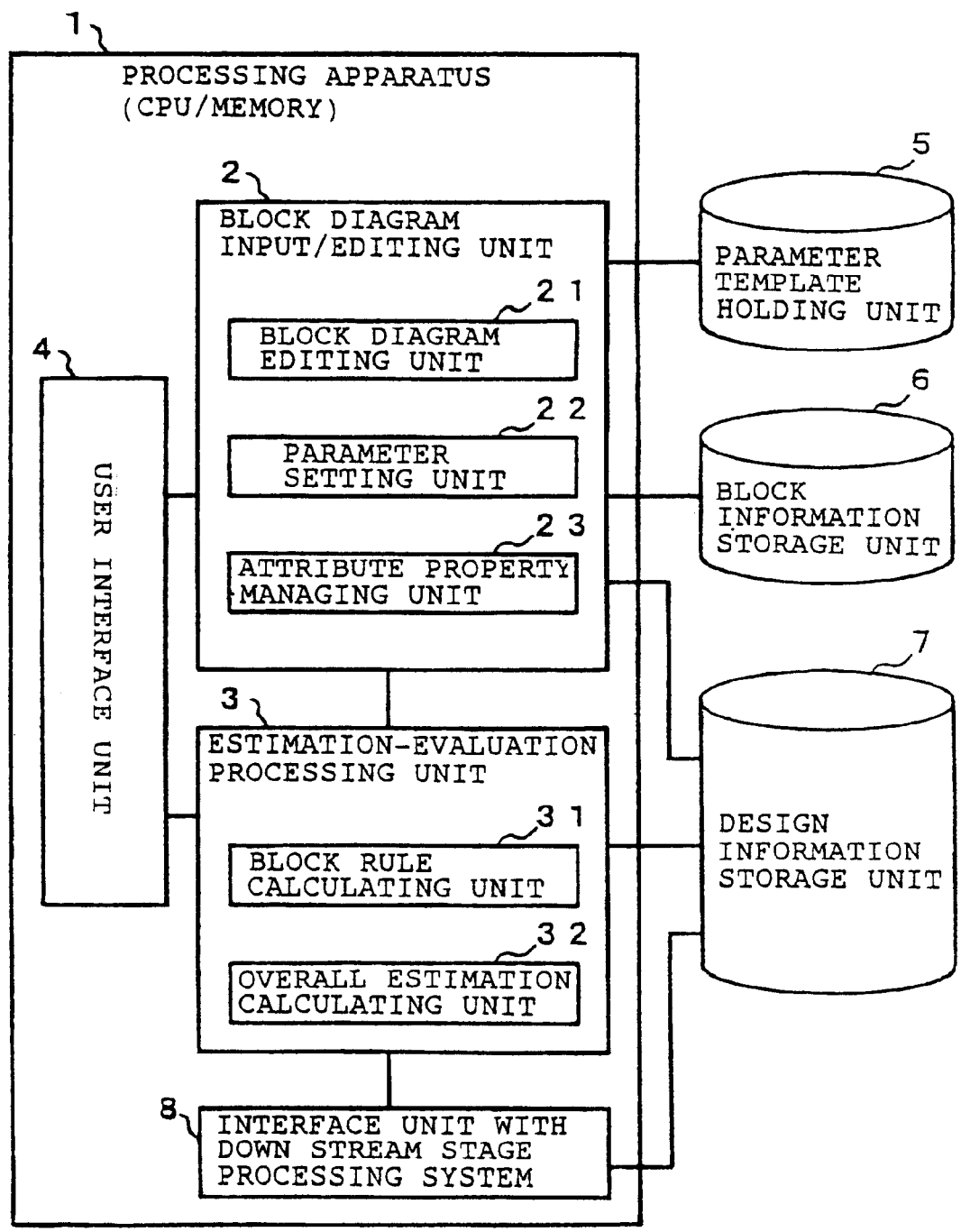
FIG. 1 schematically shows a block structural diagram according to the present invention.

FIG. 1 schematically shows an example of a block arrangement according to the present invention.

In FIG. 1, reference numeral 1 indicates a process apparatus comprised of a CPU, a memory and the like; reference numeral 2 indicates a block diagram input/editing unit; and reference numeral 3 shows an estimation/evaluation processing unit. Also, reference numeral 4 denotes a user interface unit; reference numeral 5 shows a parameter template holding unit; reference numeral 6 represents a block information storage unit; reference numeral 7 indicates a design information storage unit; and reference numeral 8 denotes an interface unit with respect to a downstream stage processing system.

The block diagram input/editing unit 2 is such a means for inputting/editing a block diagram, and for saving edit result data in the block information storage unit 6 as a library, and further for storing design information into the design information storage unit 7, which has been inputted in combination with a block diagram. The block diagram input/editing unit 2 contains a block diagram editing unit 21, a parameter setting unit 22, and an attribute property managing unit 23.

The block diagram editing unit 21 is such a means for inputting/editing symbols and lines which constitute a block diagram to be designed. It should be understood that a symbol and a line of a block diagram are similarly handled as symbolized design information. When a model (symbol, line) is inputted, a parameter template registered into the parameter template holding unit 5 may be employed. Also, the presently available block information as the library in the block information storage unit 6 may be utilized when such a model is entered.

The parameter setting unit 22 adds, or changes a parameter to, or from a template of an estimation/evaluation parameter held in the parameter template holding unit 5. Also, the parameter setting unit 22 sets a value of a parameter to an arbitrary value.

The attribute property managing unit 23 is such a means for providing design information and parameter information to the model (symbol, line) inputted by the block diagram editing unit 21 so as to manage the provided model. Concretely speaking, as to the model, a physical parameter, link information to design information obtained by designing a lower-graded block and other environments, design information such as an estimation/evaluation parameter, and parameter information are managed as an attribute property.

Also, an attribute property of a symbol and a line, which can be reused may be stored in a library form into the design information storage unit 7. Furthermore, the design information of each block may have a structure capable of holding detailed information with a plurality of hierarchies so as to be managed.

The estimation/evaluation processing unit 3 is a means which estimates/evaluates each of blocks, and also estimates/evaluates an overall block diagram, and then stores the evaluation result into the design information storage unit 7. This estimate/evaluation processing unit 3 includes a block rule calculating unit 31 and an overall estimation calculating unit 32.

The block rule calculating unit 31 is such a means for estimating/evaluating a block by using a parameter specific to this block and an estimation/evaluation rule.

The overall estimation calculating unit 32 is such a means for estimating/evaluating an overall design subject by using a parameter designated to each of the blocks, and the value calculated by the block rule calculating unit 31.

The user interface unit 4 is such a means for interfacing either the block diagram input/editing unit 2 or the estimation/evaluation processing unit 3 with a user. This user interface unit 4 employs a GUI (Graphical User Interface).

The parameter template holding unit 5 is such a means for storing thereinto a template used to input parameters of a symbol and a line while a block diagram is inputted/edited.

The block information storage unit 6 is such a means for registering the block information as a library form to save the registered block information, which is produced in the block diagram input/editing unit 2 and can be reused. In this case, a term "block information" implies a symbol of this block, a property template specific to this block, an estimation/evaluation rule, and the like.

The design information storage unit 7 is such a means for storing thereinto design information as a database.

The interface unit 8 with the downstream stage processing system corresponds to a means for interfacing the present system and the process system in the downstream stage.

The present invention may own the below-mentioned features:

(1) The present invention is featured by such a block diagram input/editing system capable of handling a symbol and a line as similar models, and also capable of handling a plurality of abstract levels.

In a block diagram formed while a system is designed/studied, a box (symbol) representative of an independent function, and a line for connecting a box with another box own a function. Any of the box and the line owns such a structure to which design information and parameter information can be provided. Furthermore, these box and line may be constituted in such a manner that a plurality of detailed information can be given as an idea of "layer" to the design information thereof.

In this system, both the symbol and the line are edited by that the design information thereof are similarly symbolized.

(2) The present invention is featured by such a block diagram editing/evaluating system having a general-purpose characteristic based upon a property and a parameter template.

In accordance with this system, the estimation parameter information is prepared as the template in the parameter template holding unit 5, so that a user is prompted to input. This estimation parameter information is given to the symbol and the line, which are entered by the block diagram input/editing unit 2. Also, this system owns a parameter setting unit 22 capable of freely adding/changing an arbitrary parameter, depending upon a design subject and a content of estimation/evaluation.

(3) The present invention is featured by such a block diagram editing/evaluating system capable of storing design data and evaluation result data obtained in a designing/evaluating stage.

This system is equipped with the evaluation/estimation processing unit 3 for linking design information to evaluation result information, which are acquired when a designing is evaluated in a halfway of the entire designing, and for automatically storing the linked design/evaluation result information. As a result, various designing cases may be evaluated by way a so-called "cut and try" manner, and a large number of evaluation results may be considered in a comparison manner, so that an optimum designing result may be employed.

(4) The present invention is featured by such a block diagram editing/evaluating system capable of storing thereinto an evaluation rule applied to a design block.

This system can register an estimation/evaluation rule used to estimate/evaluate (calculate) a design block which can be reused based upon an input parameter template for executing an evaluation when this design block is used, and furthermore an inputted parameter.

(5) The present invention is featured by such a block diagram input/editing system capable of setting a parameter by a parameter template with respect at each block.

In this system, when a block which can be reused is used, a parameter setting window is displayed with reference to a parameter template owned by this block stored in the block information storage unit 6, so that a specific parameter while this block is used may be prompted to be entered.

(6) The present invention is featured by such a block diagram evaluation system capable of employing an evaluation parameter in precision depending upon an input level.

This system is equipped with the overall evaluation calculating unit 32. That is, in such a case that a single block is constituted by a plurality of blocks having more detailed levels while designing the block more in detail, overlapped parameter information is evaluated by utilizing parameters to which more detailed design levels (lower-grade levels) have been applied. The overall estimation calculating unit 32 employs a parameter of an upper-graded block in such a case that a parameter of a lower-level block is imperfect. In other words, the overall estimation calculating unit 32 owns such a function that a perfect parameter (namely, parameter provided to all blocks in this level) in a more detailed level is employed every parameter.

(7) In accordance with the present invention, in the above-described item (1), the above-explained level information setting means is preferably provided with a design information editing means for editing the design information with reference to plural levels of information in correspondence with a level layer.

In the above-described item (1), this system may be provided with a document data link means for linking document data to the above-explained design information, and also a document data editing means for editing document data while the design information is edited.

In the above-explained item (1), the above-described design information setting means is a system design/evaluation CAD system featured by comprising a dimension editing means for setting the dimension of the symbol to an arbitrary dimension.

Also, in the item (1), the above-described block diagram editing means may include an input/output port forming means for automatically forming the input/output port of a signal when a line is connected to a formed symbol.

In the above-described item (1), the system may be provided with an allocating means for linking other design information to a single symbol and for allocating a plurality of hierarchical information to the linked symbol, so that a plurality of hierarchies may be defined with respect to a single symbol.

In the item (1), the system may be provided with a symbol automatic forming means for automatically forming symbol shape data by dragging and dropping a symbol forming description language and data of a block diagram on a symbol forming panel.

In the item (1), the system may be provided with a hierarchy editing means for designating a plurality of blocks, and for synthesizing these blocks with each other to form a single hierarchy, or for separating these blocks into a plurality of hierarchies.

Also, in each of these hierarchies, the blocks are edited, and the edition contents in the relevant hierarchy may be reflected to either an upper-grade hierarchy or a lower-grade hierarchy.

It should be understood that the above-explained respective arrangements may be combined with each other to be used as being permitted as possible.

The system according to the present invention may be operated as follows:

In the present inventive system, a structural diagram is inputted while using a block diagram as a base so as to consider a system, and parameters are given to each of symbols and each of lines (interfaces) so as to be estimated/ evaluated. Furthermore, a block diagram used to study architecture may be used so as to design more in detail, so that the block diagram may be designed in detail up to a level of a circuit diagram. Also, the system may have an entry tool structure capable of having the link information between the block diagram and HDL (hardware design language) design data, and also capable of handling storage defined from an upstream stage to a downstream stage.

Subsequently, a concrete embodiment of the present invention will now be explained.

[1] INFORMATION ENTRY BY BLOCK DIAGRAM

To aid, or support designing of a system by a computer, design information is first required to be entered into the computer. In accordance with the present invention, a design document called as a "block diagram" is handled, and the block diagram is inputted and edited by the block diagram input/editing unit 2.

The major function of the block diagram input/editing unit 2 corresponds to the conventional CAD (computer aided design) technique. Since this block diagram input/ editing unit 2 is used at a stage of the system design, flexible operabilities and various sorts of information such as various sorts of physical parameters may be given to this block diagram input/editing unit 2.

As one of the functional features owned by the block diagram input/editing unit 2 according to the present invention, while lines used to connect the respective symbols with each other are handled at the same levels as the symbols, both these lines and symbols can be represented in a hierarchical manner. In a conventional CAD system for entering a block diagram and a circuit diagram, a symbol (block) represents a function, and a line used to connect these symbols is merely a wire. To the contrary, in a block diagram handled in the CAD system of the present invention, a line may be handled as such a model capable of having a function, but is not handled as a simple wire.

Figure 2:
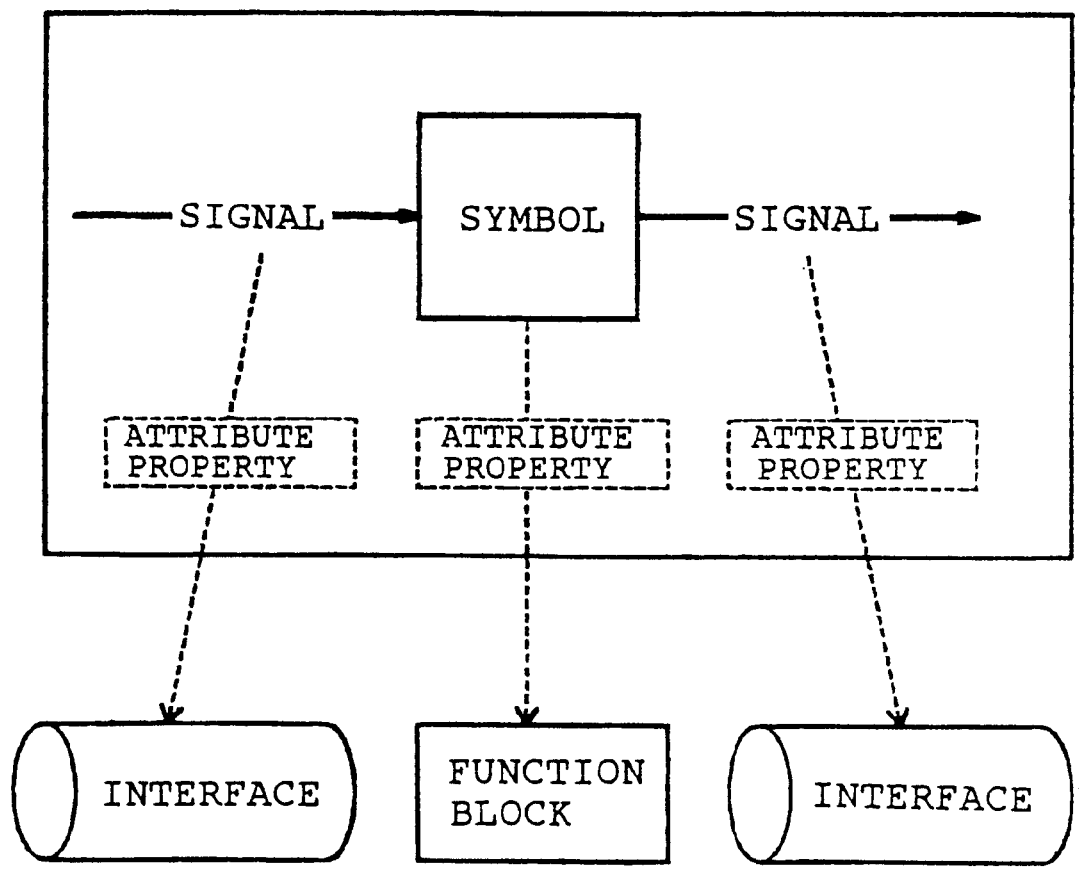
FIG. 2 an explanatory diagram for explaining an idea of an entry design model.

Moreover, in accordance with the CAD system of the present invention, a physical parameter may be given to this line. FIG. 2 is an explanatory diagram for explaining an idea of an entry design model.

As illustrated in FIG. 2, design information about a symbol and a line (signal) is managed as an attribute property. A real subject of design information about a symbol is a function block, whereas a real subject of design information about a signal is an interface. The design information is managed as an attribute property of each of models.

Concretely speaking, a function of a line is equal to protocol itself, or a function capable of realizing protocol. A physical parameter of this line corresponds to a total number of actual wires required when this protocol is realized, a circuit scale required to embody the function of this wire, and a toggle frequency of a signal.

A function block owns a link for linking a lower-graded block in a hierarchical design or to design data which is designed in another environment, and also a parameter for estimation/evaluation purposes. Similarly, an interface owns link information linked to design information, and also an evaluation parameter.

A function block and an interface own such structures that a plurality of design information having different abstract levels from each other can be held as abstract level layers.

Figure 3:
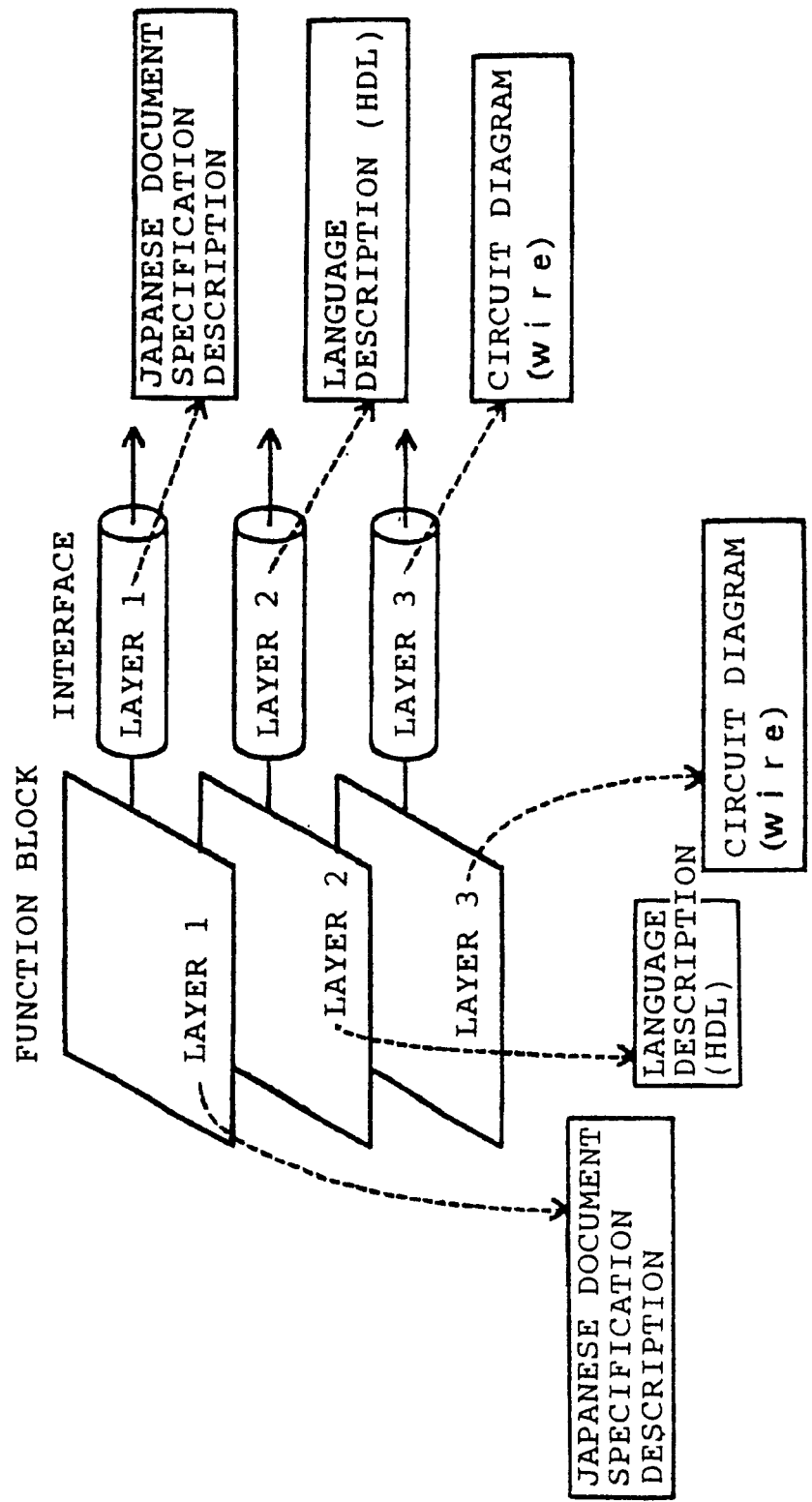
FIG. 3 represents an example of a level layer of design information.

FIG. 3 illustrates an example of a level layer of design information. In this example, design information of a function block and an interface own plural structures made of a layer 1 to a layer 3. As the layer 1, the design information owns information of a Japanese document (doc), a specification description and the like. As the layer 2, the design information owns information of, for example, a hardware description language (HDL). As the layer 3, the design information owns information about an actual circuit diagram or the like. It should be understood that the information having the highest abstract level is described in the layer 1, and more concrete/detailed information is described in the layer 2 and the layer 3 in this order.

The design information owns such a structure which can be linked to plural levels of design information, namely from the abstract description up to the concrete/detailed description, with respect to a function block represented by a block diagram, and a symbol of an interface. Since such a structure is employed, it is possible to conduct such a design method that the design is commenced from a higher abstract level, and then the detailed designs are carried out in a stepwise manner.

Figure 4:
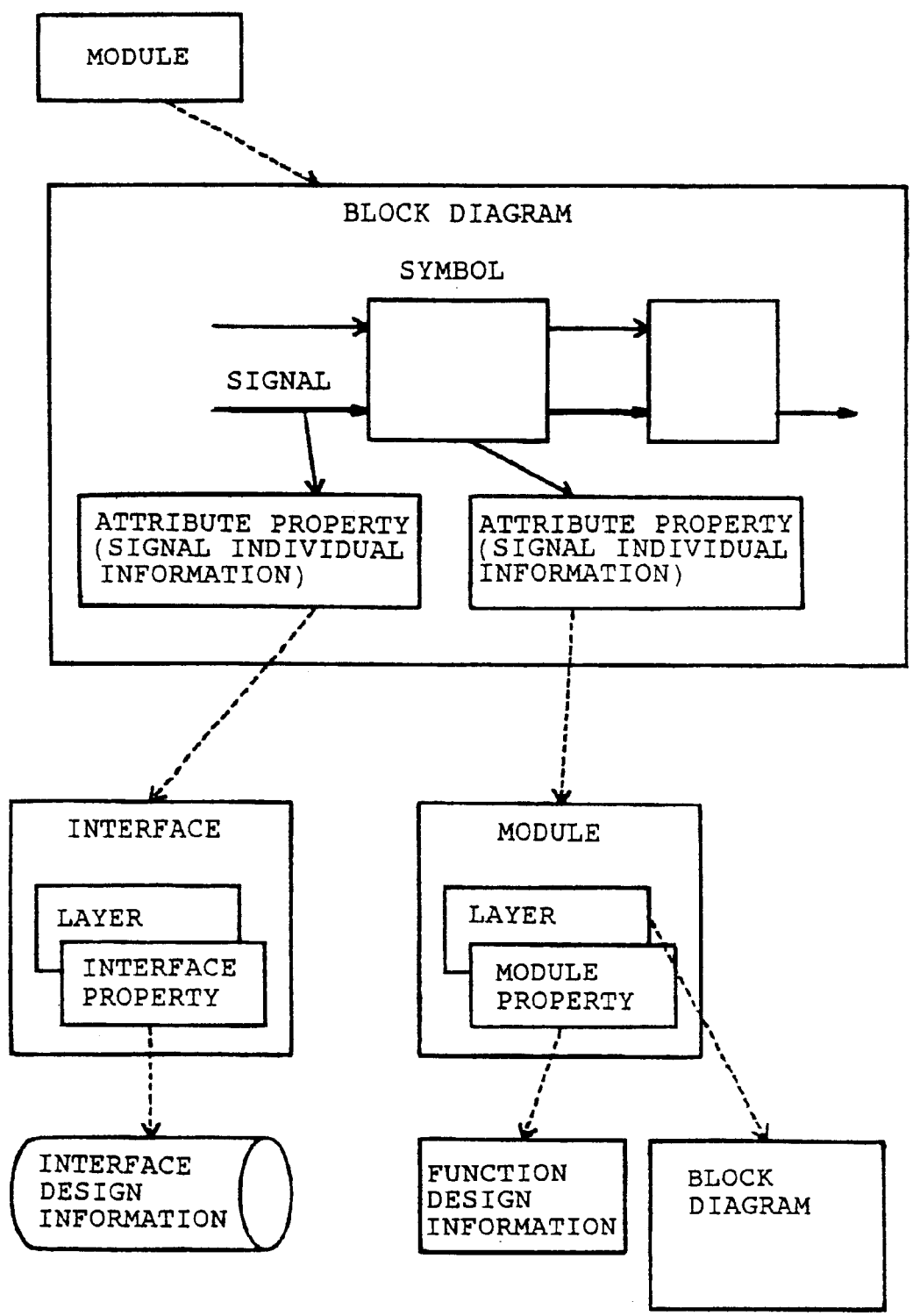
FIG. 4 indicates an example of a data structure of design information.

In order to manage the above-described level layers of the design information and also save the design information, this design information owns a data structure as shown in FIG. 4. That is, FIG. 4 is a diagram for showing an example of the data structure of the design information.

In FIG. 4, each of attribute properties for a symbol and a line (signal) owns a link to each design information, and a plurality of parameters such as a parameter for estimation/ evaluation purposes. These attribute properties may form a link structure for entire design data.

For instance, an attribute property of a signal has individual information of this signal and also link information used to be linked to an interface of a next level layer. Furthermore, the interface to be linked to this signal owns information of the layer and also an interface property thereof. Then, the interface property owns link information to the design information of the interface.

Similarly, an attribute property of a symbol owns individual information of this symbol, and link information used to be linked to a module of a next level layer. In this case, a module corresponds to a management unit of design information used, for example, when a hierarchical design is made, and this module has information which constitutes an external specification of a block. An actual content of such a module is interface design information, function block design information, or a detailed block diagram.

[2] PROPERTY AND TEMPLATE

Assuming now that a parameter of estimation/evaluation purposes is arbitrarily entered by a user, an estimation basis becomes unclear, and furthermore, a total number of collected systems requires the same number of designers. To standardize the estimation/evaluation basis and also to prompt the system designers to input information, in accordance with the system of the present invention, a parameter input field by a GUI (Graphical User Interface) is provided. To realize this parameter input field, the parameter template holding unit 5 owns such a structure that a template of an input is held as an external definition file.

When this system is initiated, the parameter setting unit 22 reads a template file from the parameter template holding unit 5, analyzes the defined information, and dynamically forms a GUI window for inputting the defined parameter. As a result, when a designer corresponding to a user tries to set a parameter into a block and an interface, this GUI window prompts the designer to input the necessary parameter. Since a separation between a necessary item and an arbitrary item is attached to a template of a parameter, the necessary information can be set without any information leakage, and furthermore the fluctuations in the estimation information caused by the individual designers can be suppressed.

Since this template file is prepared for plural sorts of design subjects, the estimation parameters depending upon the apparatus can be entered without any parameter leakage.

Also, this template may prompt the users to enter a parameter specific to a resource block every resource block in order also to reuse stored design resources (will be discussed later).

[3] REGISTERING OF TEMPLATE TO LIBRARY BLOCK

There are may cases that a function block is designed by taking account of a reuse of this function block and a designed resource is often registered as a library in order to reuse this designed resource. To this end, in accordance with the system of the present invention, block information obtained from the block diagram input/editing unit 2 is stored in the library form into the block information storage unit 6. In the case that the block information is registered as the library, since the parameter template specific to this block is set, it is possible to prompt the estimation parameter specific to this block to be entered when this block is used. Also, when this parameter is prompted to be inputted, the above-explained template is used. This property template is embedded into the block information which is stored as the library so as to be reused.

Figure 5:
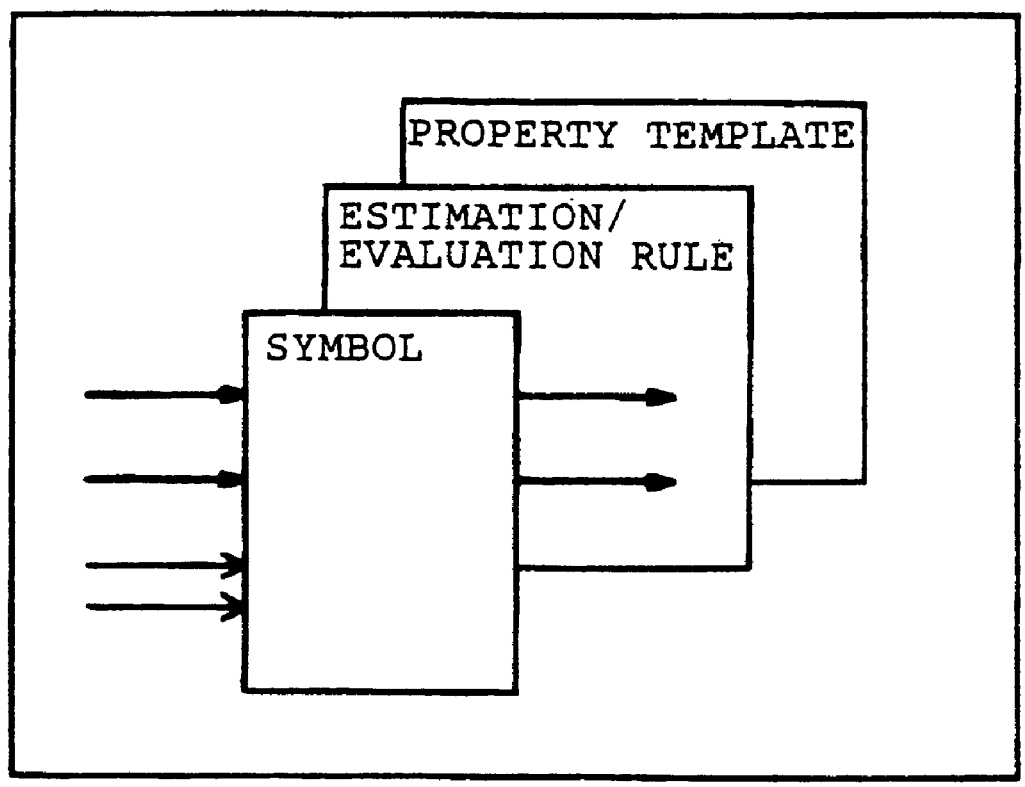
FIG. 5 shows an example of block information.

FIG. 5 represents an example of block information which is stored into a library as the know-how. The block information contains a symbol indicative of a block, an estimation/evaluation rule specific to this block, a property template, and the like.

When a certain block is introduced, the block diagram editing unit 21 reads out template information of corresponding block information from the block information storage unit 6, and dynamically forms an input prompt GUI from this read template information so as to prompt a user to input.

[4] REGISTERING OF ESTIMATION RULE INTO LIBRARY BLOCK

In accordance with the system of the present invention, an estimation/evaluation rule specific to a library block can be registered into this library block. The estimation/evaluation rule corresponds to a simple program used to estimate various sorts of design information while using the parameters which are entered in accordance with the input GUI formed by the above-explained parameter template.

The estimation/evaluation processing unit 3 executes an estimation calculation of a block by using an estimation/evaluation rule specific to this block.

In the case that the entire design system is estimated/evaluated, a calculation is made by an estimation/evaluation rule controlled by a parameter with respect to each of blocks having the estimation/evaluation rules. These calculation results are stacked for the overall system.

In order to increase precision in an evaluation prediction as to each of design subjects, the know-how must be stored, and parameters and calculation methods, which are specific to a design resource block, a macro block, are applied to these design resource block, macro block and the like.

Concretely speaking, with respect to a function block of a library, (1) a template of a specific parameter given to this function block may be defined, and also (2) a formula may be defined, which conducts evaluation values from the specific parameter and a parameter applied to an entire design subject.

When a block diagram is edited, a GUI window is displayed based on the parameter template information specific to the block so as to prompt the user to set the parameter, and then the parameter information is stored into the design information storage unit 7.

When an estimation and an evaluation are performed, a scale and a power prediction are calculated based upon a parameter set by a user and a previously-defined estimation/evaluation rule.

Figures 6, 7:
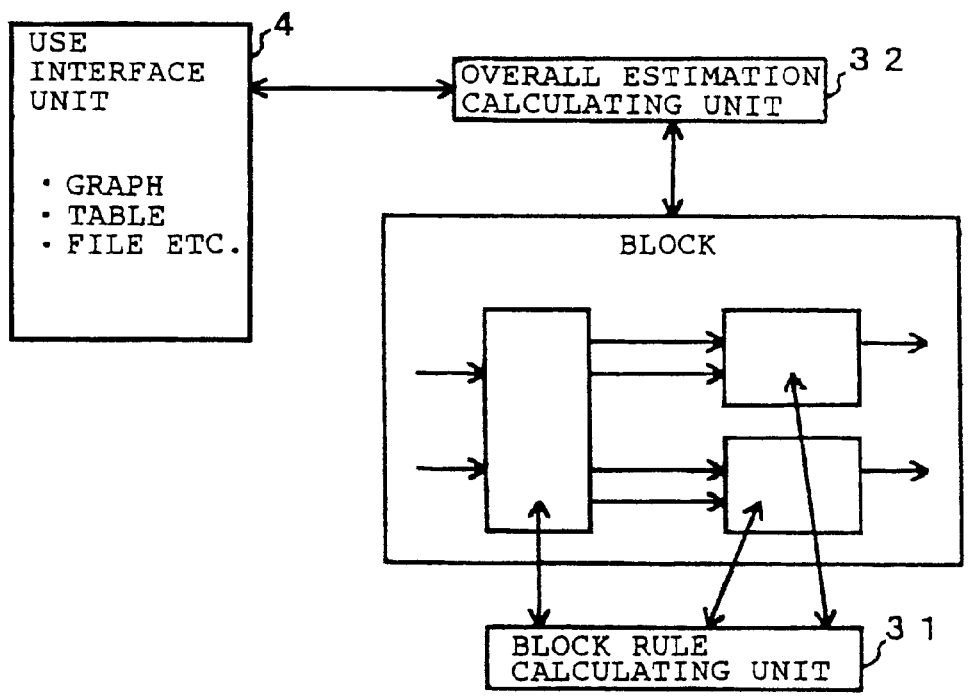
FIG. 6 illustrates an example of an estimation/evaluation rule.
FIG. 7 is an explanatory diagram for explaining a process operation of estimation/evaluation.

FIG. 6 is a diagram for indicating an example of an estimation/evaluation rule for a general-purpose parameter value required for an evaluation. The estimation/evaluation rule is a program in which a calculation method is described. Basically, this estimation/evaluation rule is arranged by a condition (if), and a calculation procedure in a case that either the condition can be satisfied or the condition cannot be satisfied.

Based upon this estimation/evaluation rule and this parameter, design know-how can be stored in the block information in the library form. Since the estimation/evaluation rule and the designated parameter are updated based on the estimation/evaluation and the final design result, the precision of the estimation/evaluation may be increased for the future.

[5] ESTIMATION/EVALUATION PROCESS

As indicated in FIG. 7, an estimation/evaluation process is carried out by the user interface unit 4, and the block rule calculating unit 31 and overall estimation calculating unit 32, which are provided in the estimation/evaluation processing unit 3.

The block rule calculating unit 31 performs the evaluation by using the parameter specific to the block and the estimation/evaluation rule, as described in the above-described items [3] and [4]. The overall estimation calculating unit 32 performs the estimation calculation of the overall design subject while using the parameter values designated to the respective blocks and the value calculated by the block rule calculating unit 31.

The estimation/evaluation process is performed by executing the estimation/evaluation calculation for each of the blocks based on the hierarchical tree of each block while executing the estimation calculating process for the overall design subject.

[6] HIERARCHY DESIGN AND PARAMETER SETTING

While designing blocks more in detail, an inside of each block is further represented as a block diagram. In this case, a parameter may be designated also to a block in a lower-graded hierarchy. As a result, a more precise parameter can be designated, so that the precision in the estimation/evaluation can be increased.

In such a case that parameters are designated to both a block of an upper-graded hierarchy and a block of a lower-graded hierarchy, the data of this lower-graded hierarchy may have a priority. In the case that the parameter cannot be satisfied in the lower-graded hierarchy, namely when there is such a block to which a specific parameter is not designated, another parameter applied to the block of the upper-graded hierarchy may be employed as to this parameter.

Figure 8:
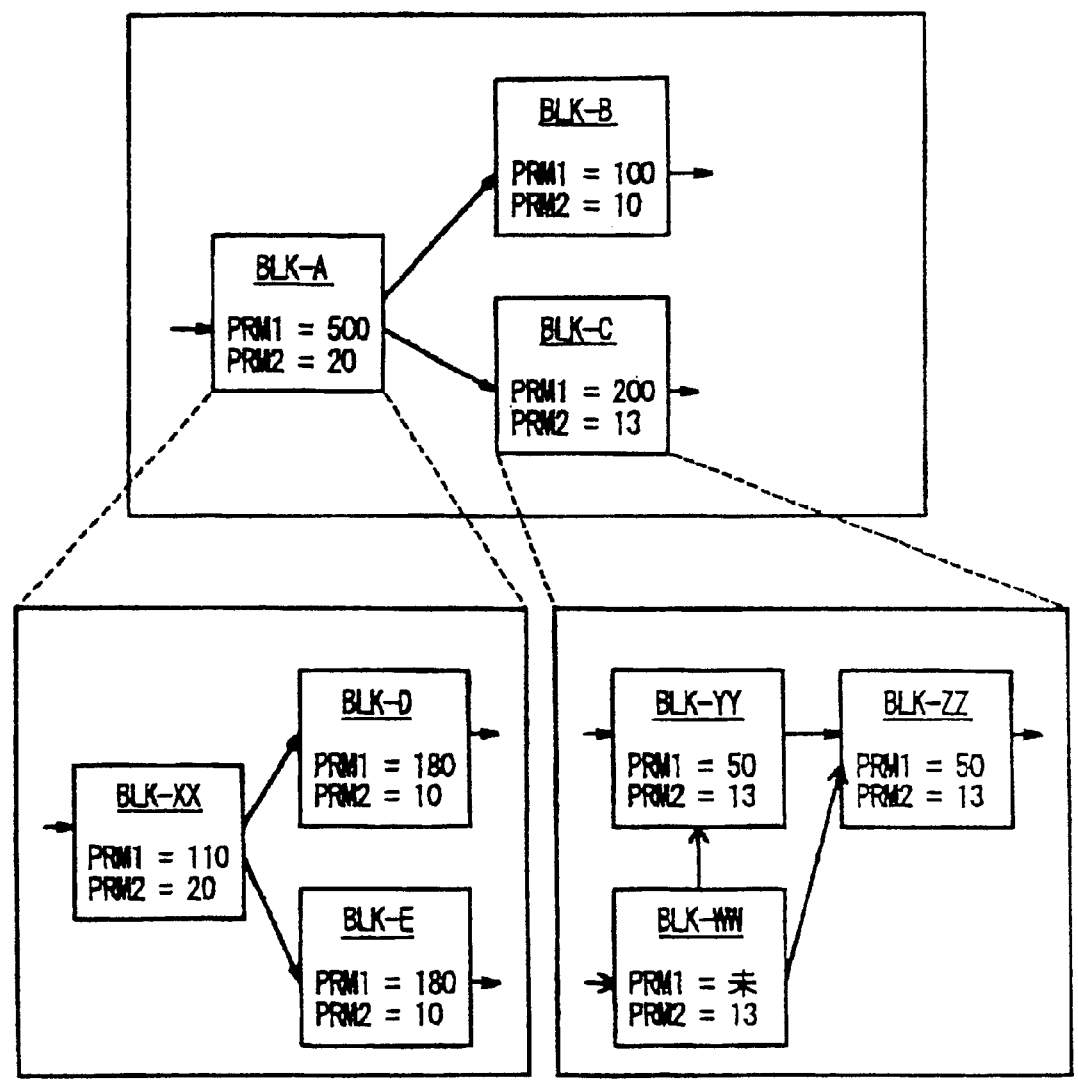
FIG. 8 is an explanatory diagram for explaining a relationship between hierarchical designing and parameter precision.

FIG. 8 is an explanatory diagram for explaining a relationship between hierarchy design and parameter precision.

In FIG. 8, a parameter value PRM1 of an upper-graded hierarchy is equal to such a value obtained by multiplying a parameter value of a lower-graded hierarchy.

An upper-graded hierarchy block BLK-A is constructed of 3 sets of lower-graded hierarchy blocks, i.e., blocks BLK-XX, BLK-D, and BLK-E.

A parameter value PRM1 of the upper-graded hierarchy block BLK-A is 500. Assuming now that the respective parameter values of the lower-graded hierarchy blocks thereof are given as follows: PRM1=110 in the block BLK-XX; PRM1=180 in the block BLK-D; and PRM1=180 in the block BLK-E, in this case, since a product value of parameters of a more detailed level than BLK-A becomes 470, another product value "470" of parameters of lower-graded hierarchy is used instead of the parameter value PRM1="500" of the block BLK-A.

On the other hand, in such a case that the value of the parameter PRM1 of the upper-graded hierarchy block BLK-C is equal to 200 and the parameter value PRM1 of the block BLK-WW in the lower-graded hierarchies is not yet set, the value of the parameter PRM1 of the block BLK-C in the upper-graded hierarchy is used without using the product value of the parameters for the more detailed blocks in the lower-graded hierarchies.

The parameter referred to as "PRM1" shown in FIG. 8 is an example such that if the parameter values of the lower-graded hierarchies are multiplied by each other, then this parameter PRM1 becomes a parameter of an upper-graded block. As such a estimation parameter, there are, for example, an area, a cost, and power consumption. Apparently, there are parameters which cannot be calculated by a simple multiplication. For instance, a delay time (cycle time) parameter, and a reliability parameter own estimation/evaluation rules, depending upon the respective parameters. It should be noted that although FIG. 8 shows the parameter setting example to the blocks, there are such parameters for the interfaces used to interface between the blocks, as explained above. Concretely speaking, as the parameter for the interface, there are provided a total number of physical lines, a toggle frequency of a signal, a signal level, and a divice technology.

Also, when there is an apparent contradictory in the values of the parameters of the blocks in the upper-graded hierarchy and in the lower-graded hierarchy, the system is not operated under normal condition, for example, also in such a case that a parameter used to calculate a circuit scale in a lower-graded block is considerably larger than that in an upper-graded block. In such a case, the estimation/evaluation processing unit 3 owns a function capable of detecting a contradictory of parameter values.

Figure 9:
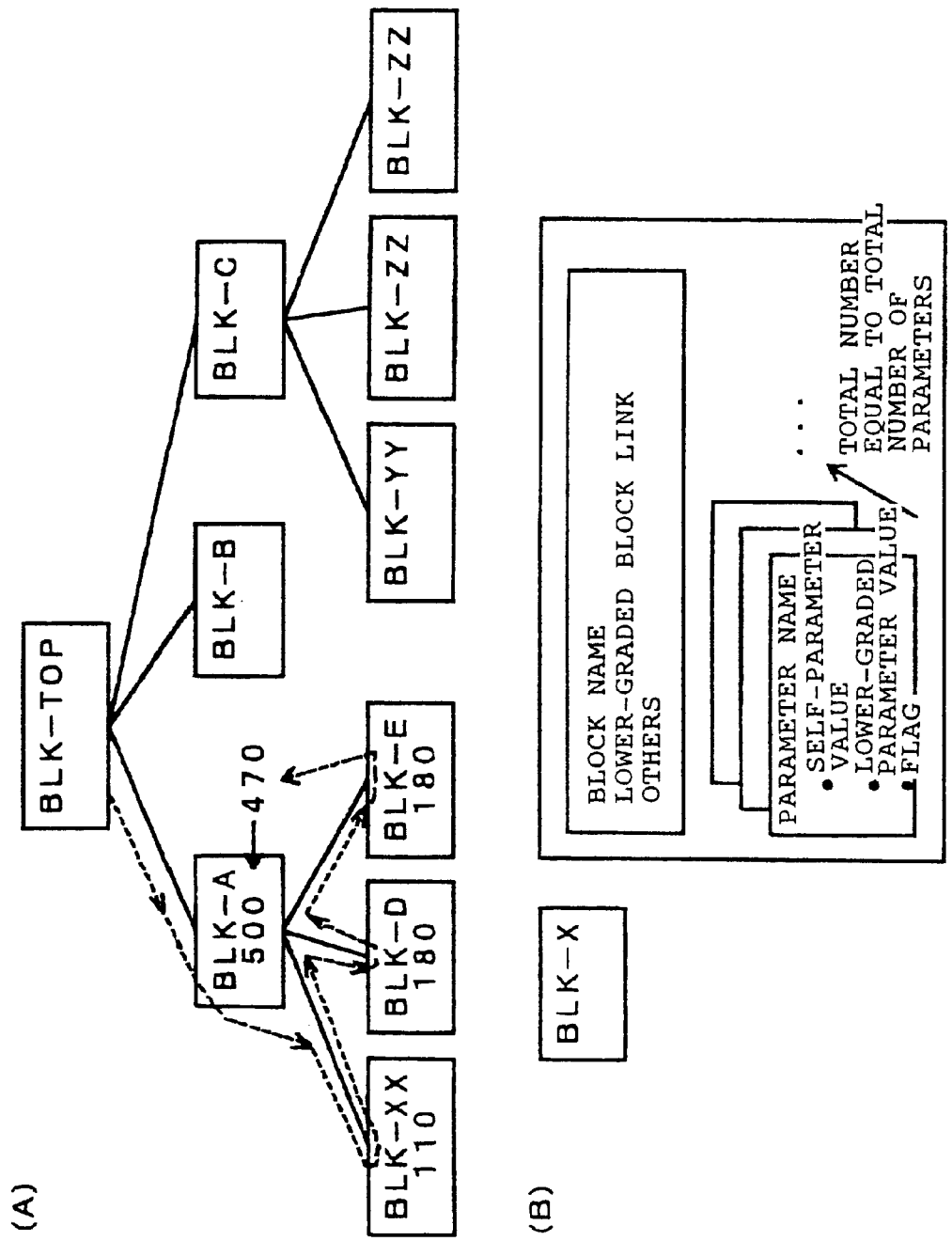
FIG. 9 is an explanatory diagram for explaining a process operation for detecting a parameter value.

FIG. 9 is an explanatory diagram for explaining a parameter contradictory detecting process. FIG. 9A represents an example of a hierarchical structure of a block to be processed, and FIG. 9B shows a data structure of parameter information of each block.

The parameter contradictory detecting idea may be realized by having block link information of a hierarchy in the data structure shown in FIG. 9A, and also a parameter shown in FIG. 9B.

As indicated in FIG. 9B, each block owns a plurality of parameter information whose number is equal to a total number of parameters other than a block name and a lower-graded block link. As the respective parameter information, there are provided an own parameter value, a parameter value based upon a lower-graded block, a flag and the like. The sort of flags and meanings of these flags provided with respect to each of the parameters are given as follows:

:Lower-graded block parameter is calculated (lower-graded parameter value is used), :Lower-graded block parameter is imperfect (self-parameter value is used), :Lower-graded block parameter is unidentified (lower-graded block is checked), and :No lower-graded block. In the overall multiplication process, the judgment is carried out when the data of the respective blocks are derived.

[7] CUT-AND-TRY EVALUATION AND SAVING OF DESIGN INFORMATION

Generally speaking, when a system is considered, there are many possibilities that an apparatus structure is studied by employing a plurality of realizing methods. While the estimation/evaluation are performed by way of the respective apparatus structures and physical realizing methods, the data acquired by the respective methods and the estimation/evaluation result are stored. After a plurality of evaluation results has been stored, an aid for seeking an optimum solution is carried out by a GUI for graphically representing these evaluation results so as to compare these evaluation results with each other. If the optimum solution can be found out from a plurality of evaluation results, then the design information at this time instant can be called. Furthermore, the arranging method is changed based on this design information, and the evaluation parameter is tuned, so that an optimum realizing method may be finally sought.

In accordance with this system, a detailed version number management is carried out with respect to design information, and every time an estimation/evaluation process is performed by the estimation/evaluation processing unit 3, the version number of the design information is increased to hold a plurality of data. This design information owns such a structure having also evaluation result data, so that the design information may be managed in combination with the evaluation result.

Also, when the design information is furthermore updated by using the evaluation result, the design information is managed in a tree structural manner as to the version number thereof. Such a version number managing method corresponds to the conventional managing method. However, the version number managing method employed in the system of the present invention is featured by that while the design information is held in combination with the evaluation results, and the evaluation results can be considered in the comparison manner.

Since the design information handled in this system corresponds to the design data in the upstream stage of the designing process, the data amount of this design information is considerably smaller than that of the circuit diagram. However, when the overall design information is saved every time the estimation/evaluation is carried out, the huge data amount would be finally saved.

Therefore, the overall design information is completely not saved, but only the changed design information is saved by giving the version number in every unit of the hierarchy block. Then, the version number of index used to manage the overall design information (namely, data for managing which block corresponds to what version number) is increased, and the increased version number of the index is saved in the design information storage unit 7 in combination with the evaluation result. The data about the estimation/evaluation result may be stored into an overall managing database (DB). Alternatively, this data may be stored into another database, or a file, and only pointer information may be stored into the managing database, namely the design information storage unit 7.

As to the execution timing of the estimation/evaluation, the version numbers of the respective blocks for constituting the overall system are checked, and the version number of the block is updated which has been changed when the previous evaluation is carried out. Then, the increased version number is saved. Thereafter, an index is formed, and this index is saved together with the estimation/evaluation data. The version number of each block does not have a suffixed version number, but is simply incremented. The saving amount of the design data can be reduced by this managing method.

FIG. 10 is a diagram for representing a relationship between a design version number and a storage of evaluation data. FIG. 10 shows such a case that while estimation/evaluation data is stored into another separated storage, only pointer information is stored into the design information storage unit 7.

FIG. 10A shows a relationship among version numbers of blocks BLK-A, BLK-B, BLK-C in a version number 2.1, and the version number 2.1 branched from an entire version number 2. In the version 2.1 of the overall version, as to version numbers of design information of the respective blocks, BLK-A is a version 2; BLK-B is a version 2; BLK-C is a version 4.

FIG. 10B represents an example of an index for managing the overall version number. In this index, both pointer information to estimation/evaluation data and version number information of the respective blocks are stored.

The present system may be realized by hardware and software of a computer, for example, a workstation and a personal computer.

Figure 11:
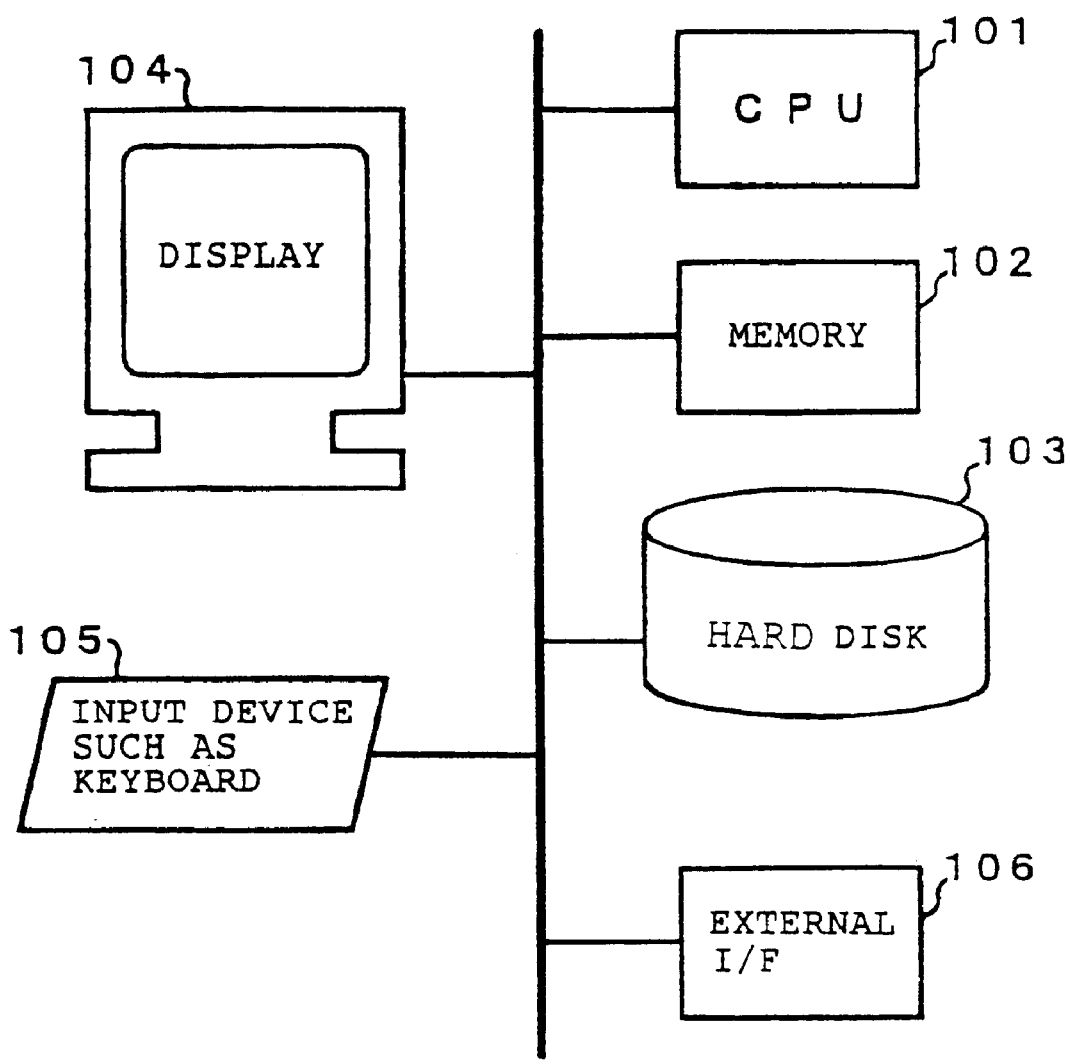
FIG. 11 schematically shows an example of an apparatus arrangement according to the present invention.

FIG. 11 shows an example of an apparatus arrangement used when the present invention is conducted. Normally, a program and design data, by which the present system is realized, are stored into a magnetic disk 103, and are read into a memory 102 when the program is executed. A CPU 101 fetches and executes a command of the program read into the memory 102.

While a block diagram and parameter information are edited, these data are placed on the memory 102, and the display process on the display 104 as well as the editing process by inputting data from a keyboard and other input device 105 are carried out by the program. When the editing process for the design data is accomplished, this design data is stored into the magnetic disk 103. The estimation/evaluation result data are stored into the magnetic disk 103.

An external interface (I/F) 106 corresponds to an apparatus used to be connected with another workstation and a personal computer, and is not necessarily required in accordance with the present invention. This external interface (I/F) 106 may be used in such a case that a design work is performed by using a plurality of workstations and a plurality of personal computers.

Next, a description will now be made of a process flow operation by the CAD system according to the present invention while designing an LSI (Large-Scaled Integration).

(1) SCHEMATIC BLOCK DIAGRAM INPUT PROCESS

A schematic block diagram is entered by the block diagram input/editing unit 2.

When a block diagram is entered, a symbol and a signal may be arbitrarily formed without employing a library. When a arbitrary type signal (line) is entered to connect a symbol, a pin is formed. It should be noted that a resource library such as a system macro stored in the block information storage unit 6 may be used as a signal input. These symbol and signal may be entered without taking account of the physical hierarchy such as System, BWB, PCB, and LSI.

Figure 12:
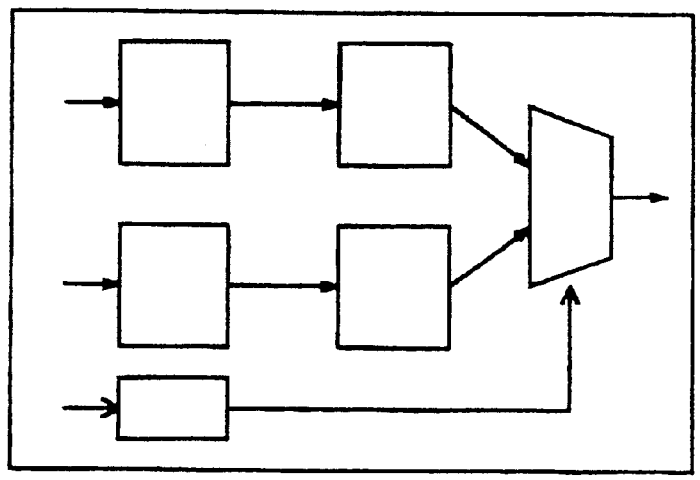
FIG. 12 shows a schematic block diagram entered by a block diagram input process according to the present invention.

FIG. 12 is a diagram for indicating an example of a schematic block diagram entered by a block diagram input process operation.

(2) SETTING OF PARAMETER

A parameter used for an estimation/evaluation purpose is entered/set on the block diagram shown in FIG. 12 by the block diagram input/editing unit 2. A parameter input screen is displayed, which is automatically formed from the template definition file and the like saved in the parameter template holding unit 5. The user inputs parameters in response to this item.

Figure 13:
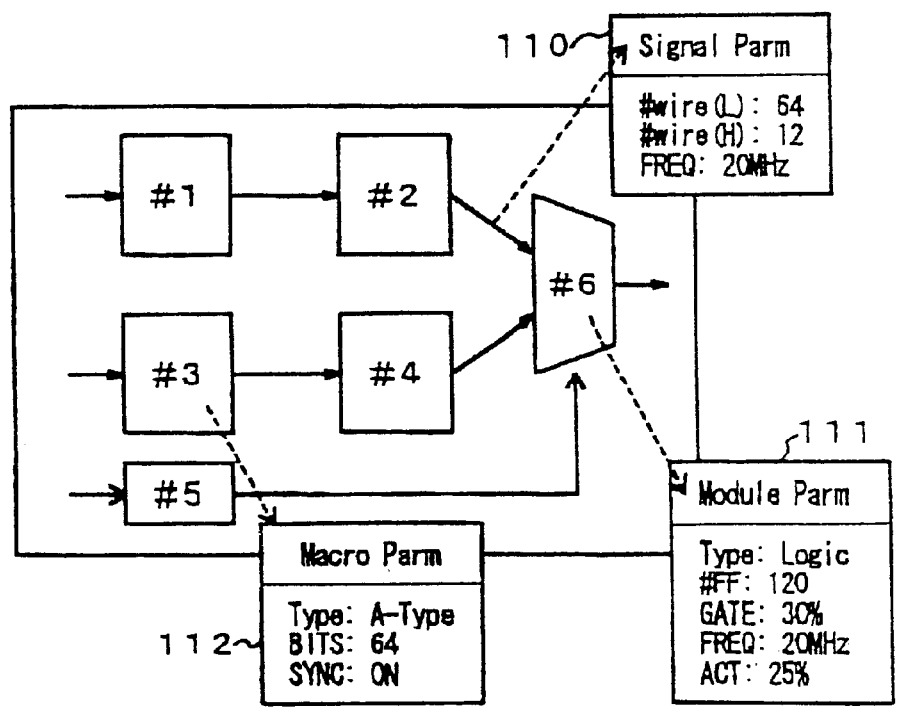
FIG. 13 is a diagram for showing an example of a parameter input.

FIG. 13 is a diagram for indicating an example of a parameter entry.

A signal parameter input window 110 for a signal which connects a symbol #2 to another symbol #6 within a block diagram corresponds to such a screen which is automatically formed from the template definition file stored in the parameter template holding unit 5. Similarly, another module parameter input window 111 of a symbol #6 is a screen which is automatically formed from the template definition file stored in the parameter template holding unit 5. A macro parameter input window 113 of a symbol #3 corresponds to an input screen of a parameter specific to a library block. A template is held by every library.

A user (designer) enters/changes the parameters from these input windows 110, 111, 112 and so on to arbitrarily set parameters.

For instance, general-purpose parameters such as a total number of flip-flops(FF), a total number of gates, an operation frequency, and an operating rate are set to a logic module of the symbol #6, which is arbitrarily formed. With respect to a library macro of the symbol #3, a parameter specific to the library macro, a realizing method, a function, and bit are set. A total number of signals (highspeed, normal) and a frequency during implement are set to a signal appearing between the symbols #2 and #6. Bit, word, column and the like are set to ROM and RAN.

FIG. 14 represents an example of parameter information applied to each block. The parameter information entered from the above-described input window is managed by, for instance, a parameter list as shown in FIG. 14 within the system.

(3) SETTING OF ESTIMATION/EVALUATION CONDITION

Subsequently, an estimation/evaluation condition is set.

Figure 15:
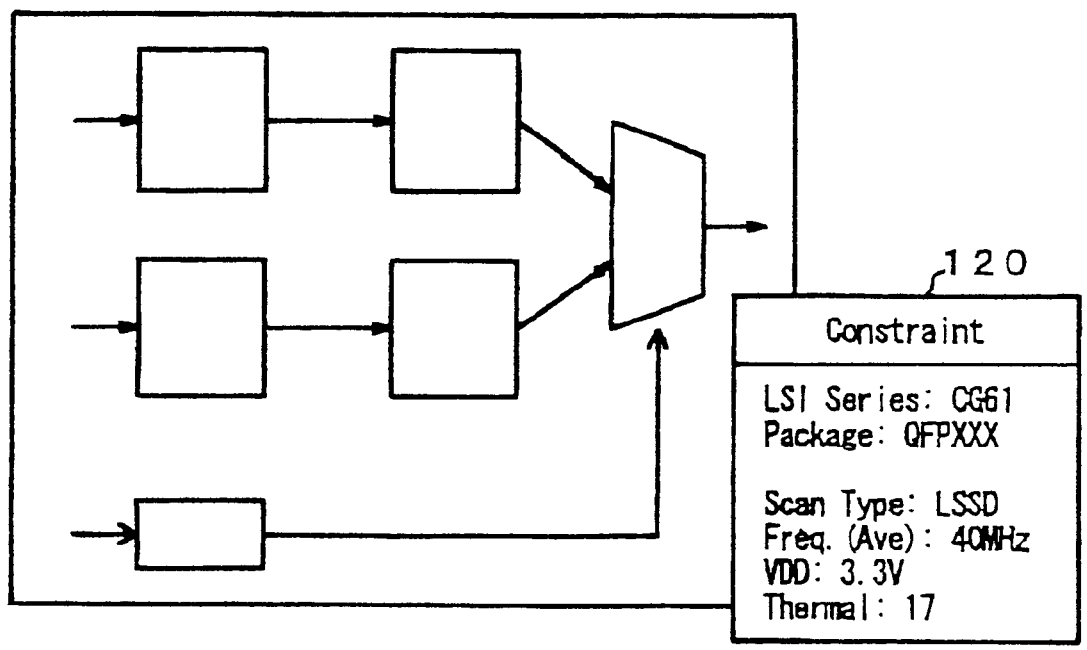
FIG. 15 illustrates an example of setting of an estimation/evaluation condition.

FIG. 15 indicates an example of setting an estimation/evaluation condition. An estimation/evaluation condition setting window 120 as indicated in FIG. 15 is automatically produced from a template definition file by the block diagram input/editing unit 2 to be displayed. From an input screen of this window 120, various design conditions are set, for instance, a technology (LSI series) to be implemented, a package type, a scan type, an average operating frequency, and a power supply voltage. Since the technology and the like is selected, menu information designatable by this selected technology is read from the parameter template holding unit 5 and the like, and various sorts of conditions may be set in the manner selected from the menu.

FIG. 16 represents a concrete example of the estimation/evaluation condition which is set by entering the condition from the estimation/evaluation condition setting window 120 as indicated in FIG. 15.

(4) EXECUTION OF ESTIMATION/EVALUATION PROCESS

Based upon the set estimation/evaluation condition, the estimation/evaluation processing unit 3 executes an estimation process and an evaluation process. When a block owns a hierarchical structure, the estimation/evaluation processing unit 3 calculates an estimation/evaluation process of each block, and an overall estimation/evaluation obtained by multiplying evaluation results of lower-graded hierarchy blocks.

Figure 17:
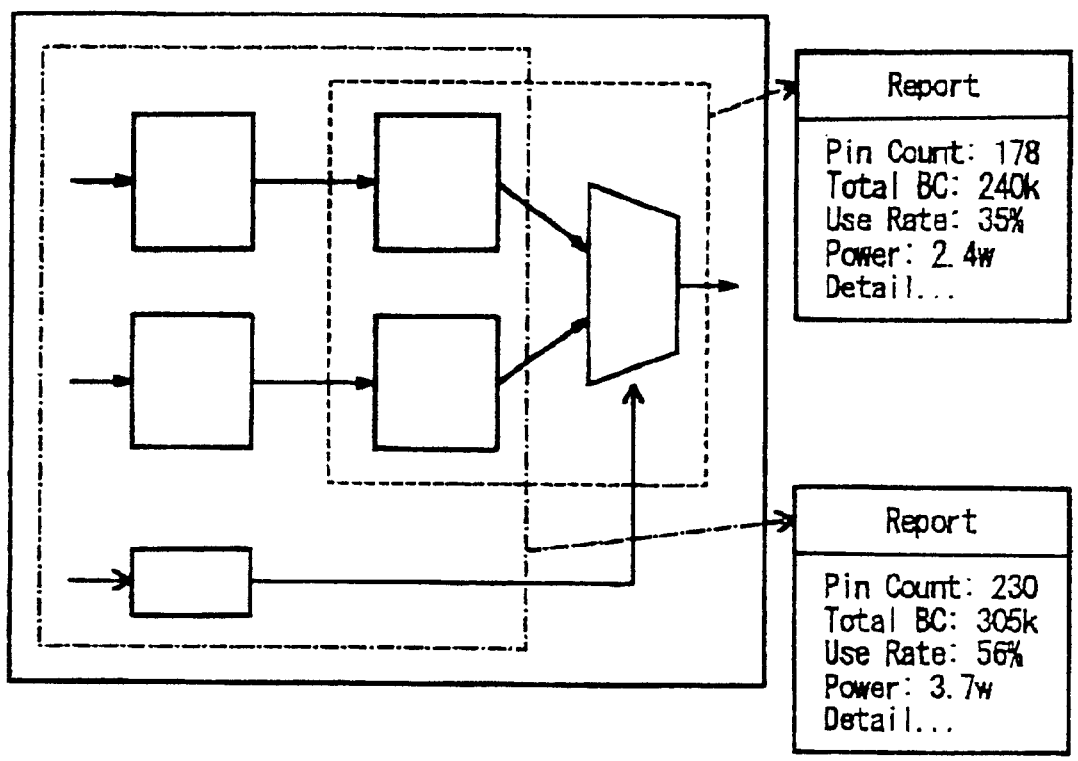
FIG. 17 is a diagram for indicating an example of an estimation/evaluation result by a physical subdivision.

Furthermore, the estimation/evaluation processing unit 3 can estimate/evaluate a physical subdivision such as a so-called "cut an try" manner. FIG. 17 represents an example of a screen for displaying an estimation/evaluation result of the physical subdivision.

For example, as in the case of a chip subdivision, since a physically dividing range is designated, the estimation/evaluation results can be confirmed with respect to each of the subdivided ranges, for instance, a use rate and power consumption as to a pin count, a total BC number, and a bulk. In FIG. 17, a frame surrounded by dots and another frame surrounded by a dot/dash line denotes a subdivision range. Alternatively, a color of the frame may be changed to be displayed. A report of the evaluation result is displayed with respect to each of the subdivided ranges.

The above-described "cut and try" manner can be readily executed by repeatedly changing the subdivided ranges, executing the estimation/evaluation process, and displaying the estimation/evaluation result.

(5) PHYSICAL SUBDIVISION (RECONSTRUCTION OF HIERARCHICAL STRUCTURE)

The so-called "cut-and-try" method is carried out by the estimation/evaluation processing unit 3 to perform the physical estimation/evaluation. Thereafter, a cut-out to a physical hierarchy (for instance, chip subdivision) is performed.

FIG. 18 illustrates such an example that a physical hierarchy is determined from an evaluation result to change a hierarchy of a block diagram. Based upon the estimation/evaluation result, a physical hierarchy is determined in a subdivision range as shown in FIG. 18A, and then as represented in FIG. 18B, a hierarchy (level layer) of a block diagram may be changed. Such a cut-out to the physical hierarchy may be readily carried out by employing a hierarchy rearranging function of a system description editor owned by the block diagram input/editing unit 2 and the like.

(6) DETAILED DESIGN

In a detailed design, a content of each module is furthermore made detail by way of a structure design by a block diagram and an operation/function design by HDL.

Figure 19:
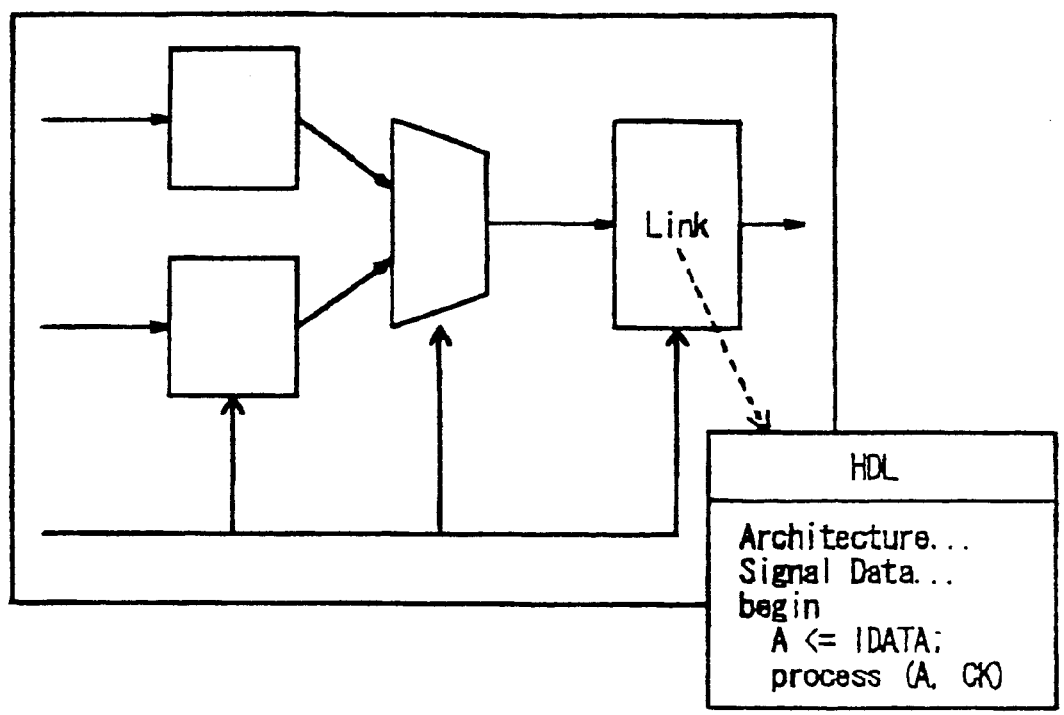
FIG. 19 is a diagram for showing a detailed example by HDL.

FIG. 19 is a diagram for indicating an example of a detailed module by an HDL description. As represented in FIG. 19, detailed information is linked from a symbol to an HDL description by making a module detail. A structure description unit of this block diagram produces an HDL net list. There is no limitation in BL and RTL as to an HDL description for executing an operation/function design.

FIG. 20A indicates an output example of an evaluation result of each block based on an estimation/evaluation condition. FIG. 20B shows an output example of an evaluation result of an entire LSI. It should be understood that the present invention is not limited to these output examples. For instance, according to the present invention, the evaluation results may be apparently outputted in an arbitrary form.

[EDITOR FUNCTION BY PRESENT SYSTEM]

Figure 21:
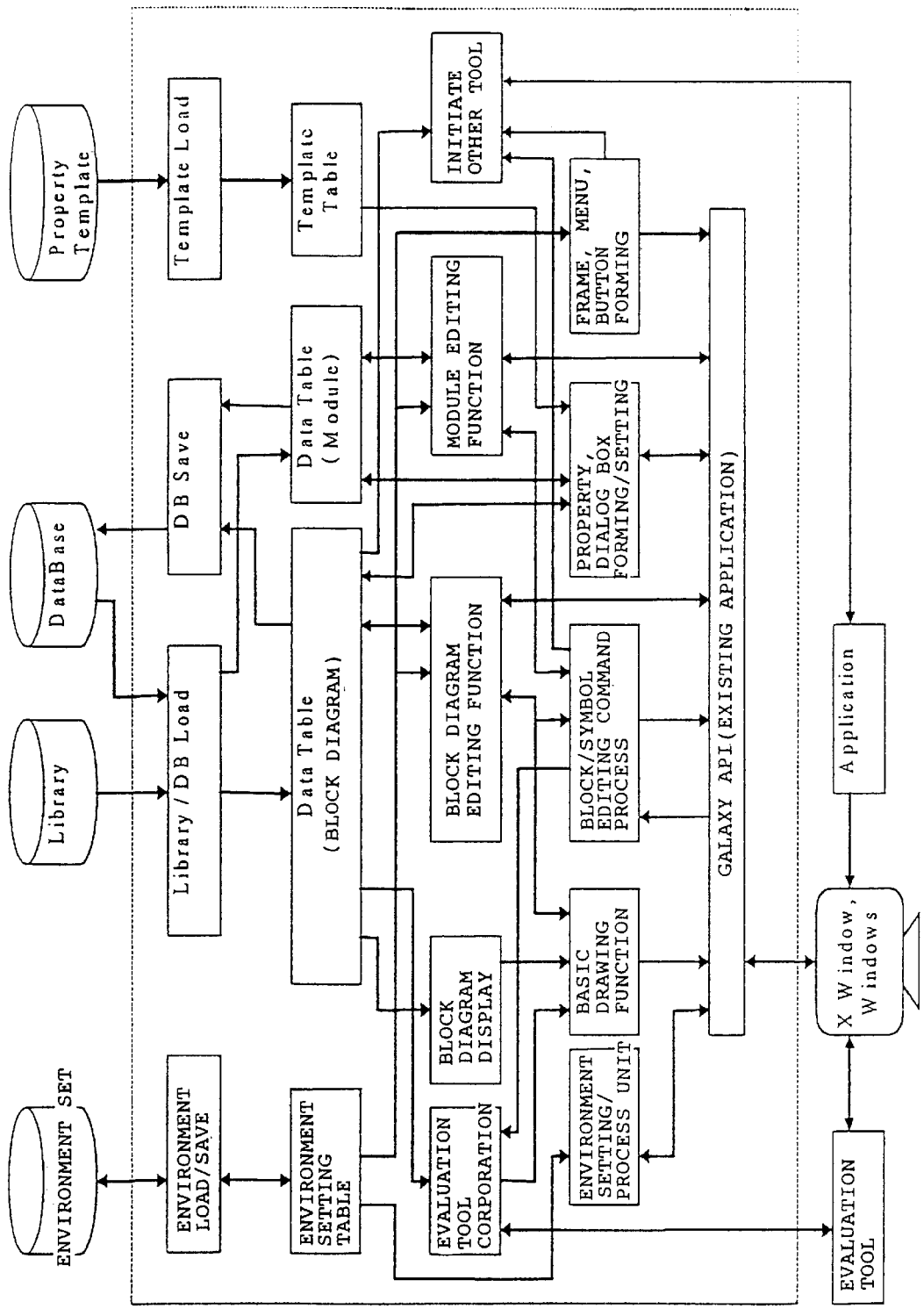
FIG. 21 schematically represents an internal arrangement of an editor.

In FIG. 21, there is shown an internal arrangement of an editor which is accomplished by expanding the system of the present invention. Then, this editor may derive data from an environment setting file, a library, a database, a property/template and the like so as to edit the derived data, and furthermore, may register data into the environment setting file and the database. Thereafter, other application software is initiated as an evaluation tool and another tool from this editor. The application software may be processed by using OS (operating system) such as the X window and the Windows in combination of this editor. In this embodiment, the following assumption is made. That is, "GLAXY API (manufactured by VISIX in USA)" is employed as an image process system API between the application software such as the editor and the X window under an X-window environment.

The structural arrangements indicated in FIG. 21 will now be successively explained as follows:

(1) ENVIRONMENT SETTING FILE

An environment setting file is such a file for defining item values which may be set by a user. The item values involve various sorts of setting modes such as an edit/display function of an editor; and operation/edit environments such as a color distribution of a screen, and a screen size.

(2) ENVIRONMENT LOAD/SAVE MEANS

An environment Load/Save means is such a means having a function for loading the above-described environment setting file on a memory table, and another function for saving a memory table changed by an environment setting/process unit into a file.

(3) ENVIRONMENT SETTING TABLE

An environment setting table corresponds to a table (class definition of C++) in which the above-described environment setting file is loaded on a memory. In various sorts of editing process operations and various sorts of screen display process operations, set operations are carried out with reference to this table. Also, the set content may be changed by an environment setting/process unit (will be discussed later).

(4) ENVIRONMENT SETTING/PROCESS UNIT

An environment setting/process unit is a GUI unit used by a user to set various sorts of mode setting (e.g., enhancement of edit/display function of editor), a color distribution of a screen, and a screen size.

While using notebook type menu, pages (tab) are subdivided into every category.

While a setting window is opened, a button, selection menu, and character string display/input may be performed with respect to each of the setting items, and the changed content are reflected on the environment setting table.

(5) LIBRARY/DATABASE

In this system, a Library/Database owns the same structures as the library and also the database, and the "Library" may be cut out from the "Database" by using a directory during operation.

The Library contains modules in the respective levels, such as a existing design resource, a macro, and a cell. Into the Database, block diagram data made by these combined modules, or a new module is stored.

The Library/Database has no concept of a page existed in the conventional functional diagram and the conventional circuit diagram, and is handled in unit of one hierarchy (module).

A format of the Database is equal to the format of the UNIX file system, namely files are subdivided into every module. Precisely speaking, these files are separated into a module outer skin, and a block diagram main body (corresponding to a content thereof). The module outer skin implies a table for storing information about an self-symbol, port information, property, and template. The module corresponds to information at the various levels such as the existing design resource, the macro, and the cell. This module contains an self-symbol shape, port information, property information, and template information.

A content of a file is an ASCII file which is sequentially accessed to read data into a memory so as to perform an editing operation.

(6) LIBRARY/DB LOAD

A library/DB Load is a process portion for loading the above-described Library/Database on the memory table, and is constructed of a module outer skin and a loading portion of a block diagram main body.

The module outer skin is loaded on a data table (module), whereas the block diagram main body is loaded on a data table (block diagram).

Each of the files is sequentially accessed, and owns a function for partially loading the file so as to read out only a necessary portion in a high speed. A file portion which is not instructed is skipped, and is not loaded on a memory table.

As a result, although the access time itself of the file is not shortened, it is possible to omit the time used to analyze the ASCII file to load the analyzed ASCII file.

During read operation, "Read" mode (namely, only referring), and "Write" mode (namely, reading with initial condition that editing operation is performed and writing operation is executed) can be designated. The respective files own an exclusive/common control function with respect to the same module.

(7) DATABASE SAVE (DB Save)

A DB Save executes a process operation for writing block diagram data and module data, which are edited on a memory table, into a database. This DB Save performs the exclusive control as described in Library/DB Load.

(8) DATA TABLE (Data Table (block diagram))

A Data Table corresponds to such a table for storing an element such as a symbol and a line, which constitutes a block diagram. An editing process of a block diagram is carried out on this table.

In the case of the existing data, this data table is formed from the database by executing the DB Load process. In the case of new design data, a symbol and a line are added/deleted to/from this data table by the editing function, so that block diagram data is constituted.

(9) DATA TABLE (Data Table (module))

A Data Table (module) is module outer skin information corresponding to a block diagram during editing process, and is such a table for storing various information such as a self-symbol, port information, a property, and a template. An editing process of a module is carried out on this table.

In the case of the existing module, this data table is formed by the DB Load process, whereas in the case of a new module, this data table is formed by an editing process of a module.

A library symbol shape when a library is consulted, is not stored into this data table, but into the Data Table (block diagram). This data table handles only information of a module equal to design data.

(10) PROPERTY TEMPLATE (Property Template) FILE

A property template file is such a file that a parameter (property information) is external-defined, and this parameter can be applied to a block symbol and an interface (connection definition). As a result, a panel for inputting a property can be formed while a program is changed in a minimum condition. This definition may be applied also to a library block, and the same description method is used. In this case, the definition is made by using the general text editor in the ASCII file format.

(11) TEMPLATE TABLE (Template Load) PROCESS

A Template Table process is such a process for reading the file of the above-described Property Template and then for loading the read file on a table on a memory.

(12) TEMPLATE TABLE (Template Table)

A Template Table is a table on a memory which constitutes a template of general-purpose property information with respect to a block symbol and an interface. This template table produces a dialogue box of a GUI based upon this information, and prompts the user to set the parameter value.

(13) BLOCK DIAGRAM DISPLAY PROCESS

A block diagram display process is such a process for displaying (involving "deleting") an element such as a symbol and a line stored in the data table on an editing window.

When these elements are displayed, zooming, panning, and screen-size-changing are carried out to execute a clipping process operation in such a manner that only a portion within a display range of a screen is displayed.

As to an item (block name, specific name, signal name, property value, etc.) to be displayed, a display/not display control is carried out.

(14) BASIC DRAWING FUNCTION

A basic drawing function is a basic pattern drawing routine for displaying (including deleting) a block diagram and a hierarchical symbol on an editing screen. This basic drawing function is used to draw/delete a straight line, a continuous line, a circle, an arc, a rectangle, a character and the like.

As to an overlap in displayed patterns, a color of an overlapped portion is changed. When one overlapped pattern is deleted, the color of the other overlapped pattern is returned to the original color.

This basic drawing function may handle a drag and rubber-band function of a pattern, and a change in a mouse pointer pattern.

(15) BLOCK DIAGRAM EDITING FUNCTION

A block diagram editing function corresponds to an editing function used to add, delete, move, and copy an element for constituting a block diagram such as a symbol and a signal line. This block diagram editing function constitutes a main portion of an editor.

This block diagram editing function involves many functions. For example, while a range is designated, an element is deleted, moved, and copied. A symbol followed by a signal line is moved. Also, this editing function contains a loading function of a lower-graded hierarchy to an upper-graded hierarchy, and another function of forming a module located below 1 hierarchy.

In this block diagram editing function, a block diagram may be drawn by a user friendly free operation without fixing an entry style.

(16) BLOCK/SYMBOL (Block Symbol) EDITING COMMAND PROCESS

A Block/Symbol editing command process corresponds to a process for deriving a mouse operation executed on an editing screen to allocate the derived mouse operation to various sorts of editing functions.

(17) MODULE EDITING FUNCTION

A module editing function corresponds to such a function used to edit symbol (hierarchical symbol) information of a module, a property template, a calculation formula rule, and so on.

In the case that there are provided a block diagram and a VHDL language description, this editing function is equipped with a function for automatically producing a symbol from port information.

(18) PROPERTY SETTING PANEL PRODUCTION/SET

A property setting panel production/set function is such a function for dynamically producing an input dialogue box of property information which is set to a block symbol, a module, a line, and an interface. This panel production/set function is equipped with a function for storing a set content into a data table.

A property is given to a plurality of elements, and all elements are set by using this common function.

(19) FORMING OF FRAME, MENU, BUTTON

This frame/menu/button forming portion is such a portion for defining various sorts of widget and call back routines such as Frame, Menu, Button, which constitute a GUI frame of a overall editor.

As to this portion, the GUI builder and the commercially available widget kit may be effectively used.

(20) INITIATION OF OTHER TOOLS

In this process operation, other application tools are initiated, and parameters are transferred.

This is because in such a case that a content of a symbol appearing in a block diagram is VHDL, or is formed by other tools, a text editing tool and other application software are initiated so as to edit/refer to the text/other application software.

(21) EVALUATION TOOL COOPERATION

In this evaluation tool cooperation portion, an evaluation tool used to aid a physical subdivision or the like is cooperated.

This evaluation tool cooperation portion performs various process operations, namely design data is transferred/received (DB interface in the beginning); information about a division range is transferred/received; the evaluation tool is initiated; and the evaluation result is fed back to the screen.

As to the feedback process of the evaluation results to the screen, there are a gate scale, a power indication, a change in color, a list representation, and a graphic indication to a symbol contained in a block diagram.

The above-described items are the functions of the respective structures shown in FIG. 21. Next, a description will now be made of a feature achieved when a block diagram is formed by the structures shown in FIG. 21.

The feature of the system according to the present invention is such that a line (will be referred to as an "interface" hereinafter) for connecting the respective blocks with each other is handled at the same level as the block, and both the line and the block can be represented in a hierarchical manner.

When a block diagram and a circuit diagram are entered in the conventional system, a block indicates a function, and a connecting wire is merely a wire. To the contrary, in a block diagram of the present invention, a line is not simply equal to a wire, but may own a function. Moreover, a physical parameter may be applied to a line (see FIG. 22).

Concretely speaking, a function of a line is equal to protocol itself, and also a function capable of realizing protocol. A physical parameter is equal to a circuit scale for embodying a total number of actual wires and an actual function is such a case that this protocol is realized, or equal to a toggle frequency of a signal.

As previously explained, the design information is managed as the attribute property. The block contains the design data which is designed in the lower-graded block of the hierarchy design and other environments; the link linked to the document data; and the parameter for the estimation/evaluation purposes. Similarly, the interface owns the link information liked to the design data; and the evaluation parameter.

Figure 22:
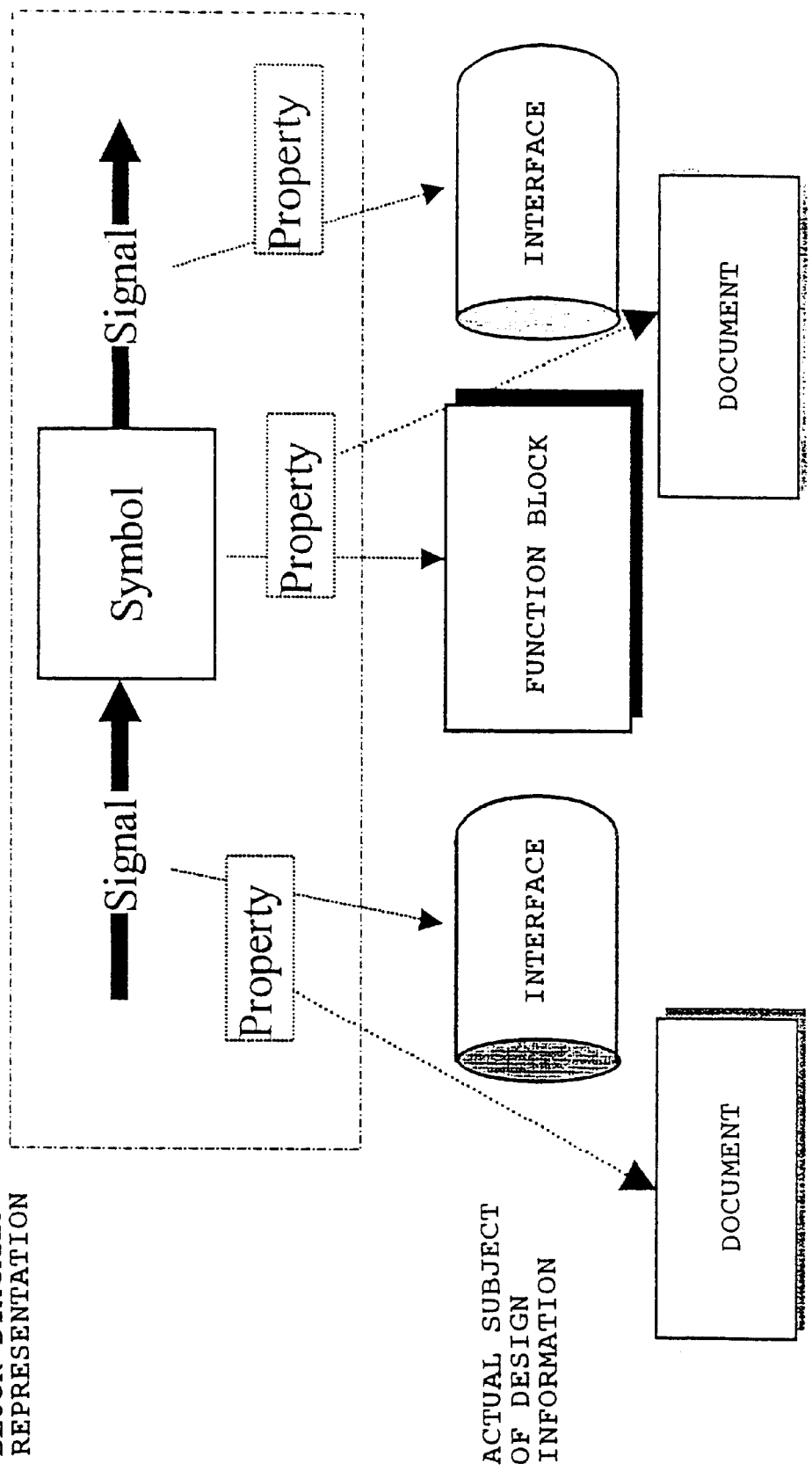
FIG. 22 is an illustration for showing an idea of an entry design model.

FIG. 22 illustratively shows an idea of an entry design model which is similar to that of FIG. 2. However, this entry design model owns such a different point that document information is linked as a property, as compared with that of FIG. 2.

This entry design model of FIG. 22 owns such a structure that a plurality of design information of a function block and an interface, which have different abstract levels from each other, can be owned as concept of abstract level layers (architecture). As indicated in FIG. 3, this is a structure which can be linked to the design information having the plural levels defined from the abstract description to the concrete detailed description with respect to the function block expressed by the block diagram, and the symbol of the interface.

As a consequence, it is possible to employ such a designing method that a designing process is commenced from a high abstract level, and thereafter a detailed design process is carried out in a stepwise manner.

In order to manage the above-described designing method and hold the design information, the design idea owns a data structure as shown in FIG. 4. In this drawing, a box of a property holds a link linked to design information, and a plurality of parameters such as estimation/evaluation parameters, by which as link structure for entire design data can be formed.

In this case, a module corresponds to a management unit of design data used when a hierarchical designing operation is carried out. This module owns such information which constitutes an external specification of a block. An actual content of this external specification is interface design information, function block design information, or a detailed block diagram.

[LINK METHOD/SEQUENCE OF DESIGN DATA]

Figure 23:
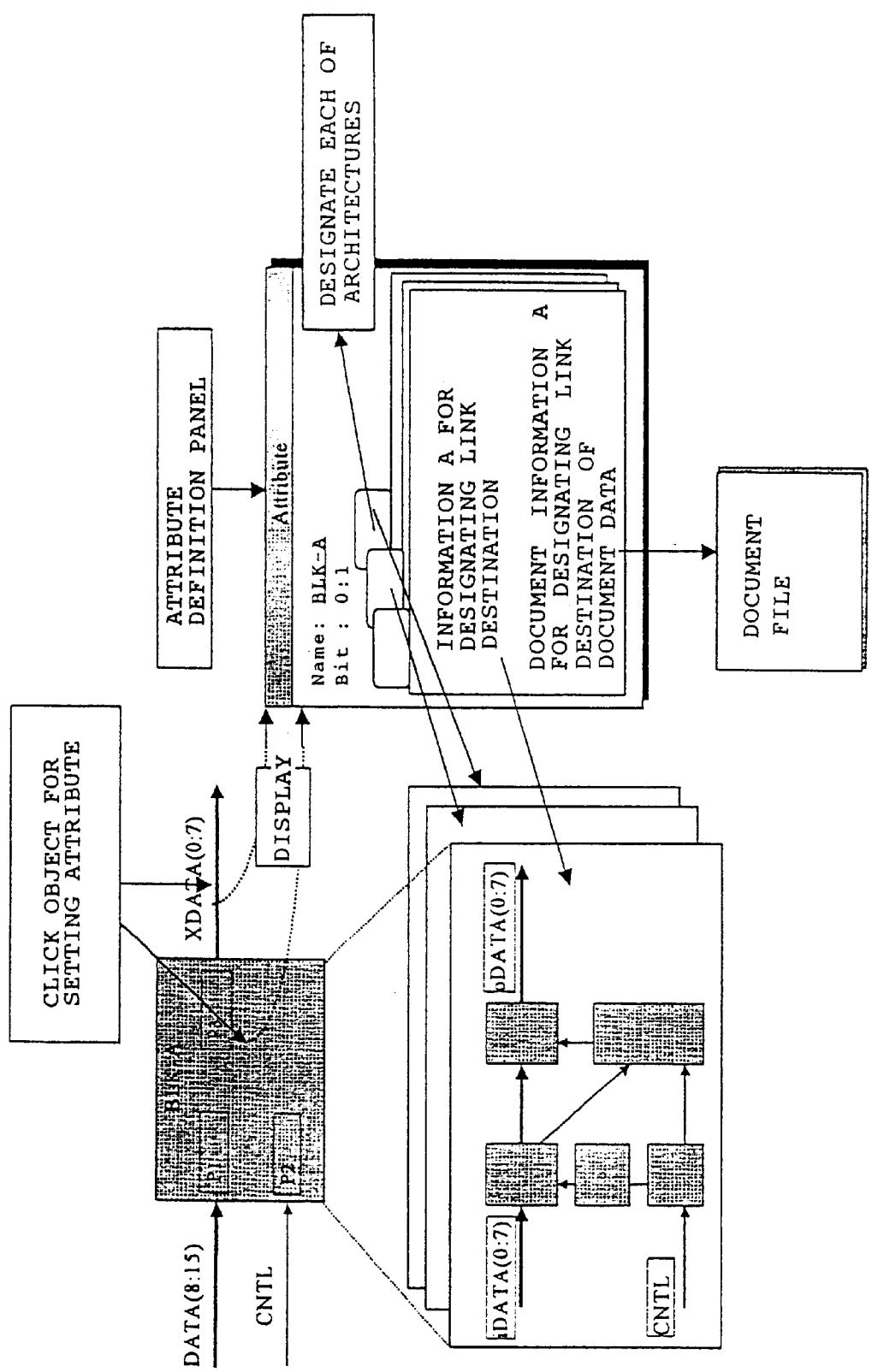
FIG. 23 is a diagram for showing a link method of design data.

(1) In FIG. 23, there is shown a link method of design data:

1) First, an object (symbol, line, etc.) to which the design data is wanted to be linked is clicked.
2) As a result, since an attribute setting panel is displayed, when a new object is clicked, a return key is pressed after entering an architecture name.
3) Subsequently, a new TAB is formed and a new panel is displayed. In this case, a name of data which is linked to this new panel is entered, or selected.
4) When the object already exists, TAB which is wanted to be linked is selected and a panel is displayed on the overall screen. Then, a name of data which is linked to this panel is inputted, or selected.

[EXTERNAL PROPERTY AND TEMPLATE]

An evaluation parameter input is provided with a parameter input field by a GUI (graphical User Interface) in order to prompt a designer to input information. In this system, such a structure is employed that an input template is saved in an external definition file in order that a change in evaluation information can be flexibly accepted.

When the system is initiated, the template file is read so as to analyze information defined in this template file, and the GUI window used to input the defined parameter is dynamically formed. As a result, when the designer equal to the user sets the parameters to the block and the interface, the designer is prompted to enter such a parameter required to be inputted. Since a partition between a necessary item and an arbitrary item is given to the template of the parameter, the necessary information can be set without any leakage, so that fluctuations in the estimation information caused by the designer himself can be suppressed.

Since the file of this template is prepared for the sort classification of the design subject, the estimation parameter depending upon the apparatus can be entered without any leakage.

A structure of an external template is indicated as follows:

(1) RELATIONSHIP BETWEEN DESIGN DATA AND EXTERNAL TEMPLATE

Figure 24:
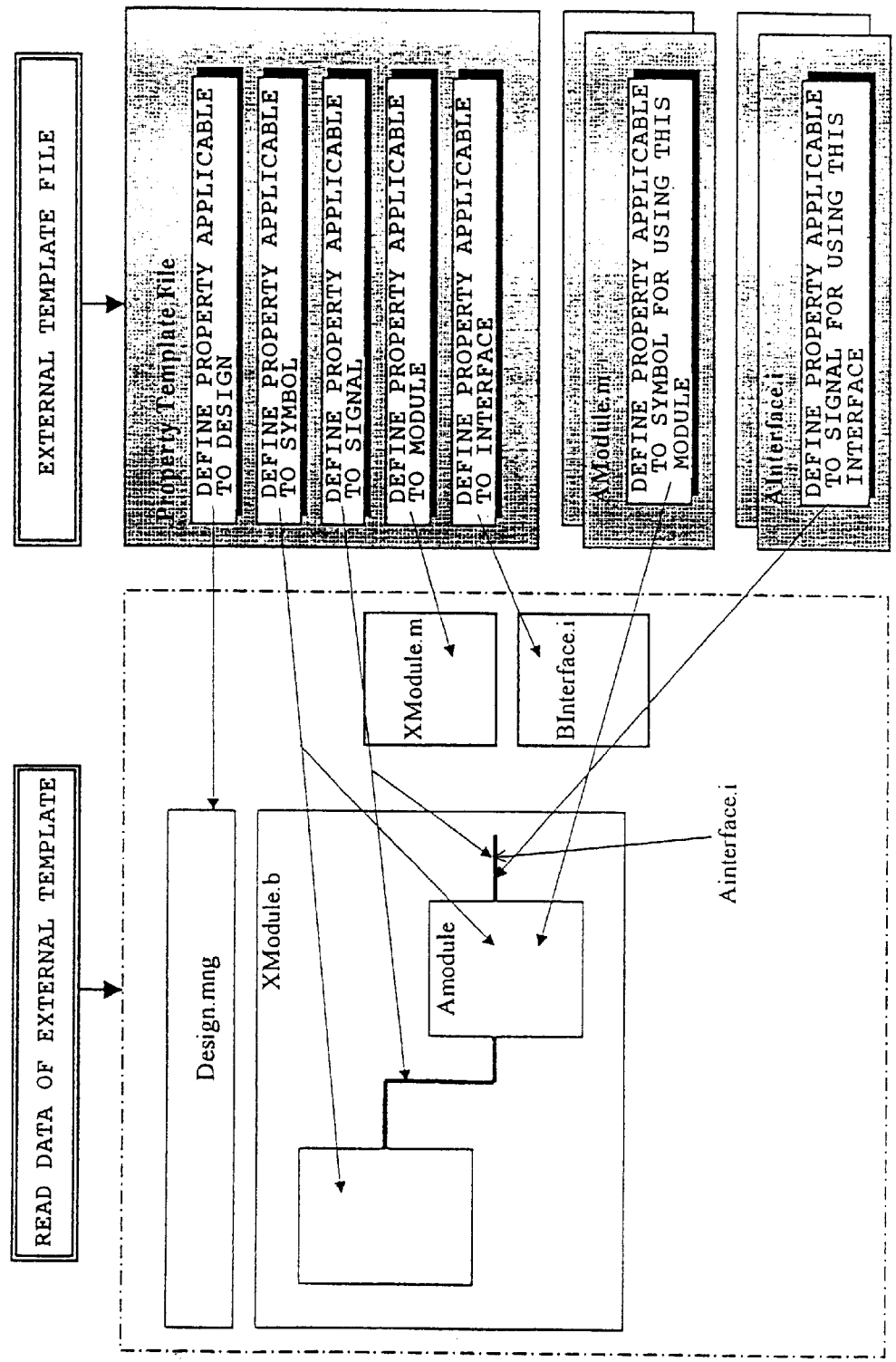
FIG. 24 is a diagram for representing a relationship between design data and an external template.

FIG. 24 shows a relationship between design data and an external template.

When the present system is initiated, the external template file is read at the same time. When the respective design data are designated by the designer, the information corresponding to these design data is displayed on the panel at the same time.

(2) PROCESS FLOW

FIG. 25 indicates a process flow.

In this flow, the system is first initiated (step 101). Next, a file is read out from the external property template file (step 102). Next, the property file is analyzed (step 103). After a screen layout has been formed (step 104), a property setting panel is outputted (step 105).

(3) EXTERNAL TEMPLATE (DEFINITION EXAMPLE)

FIG. 26 indicates a definition example.

(4) EXTERNAL TEMPLATE (SCREEN EXAMPLE)

Figure 27:
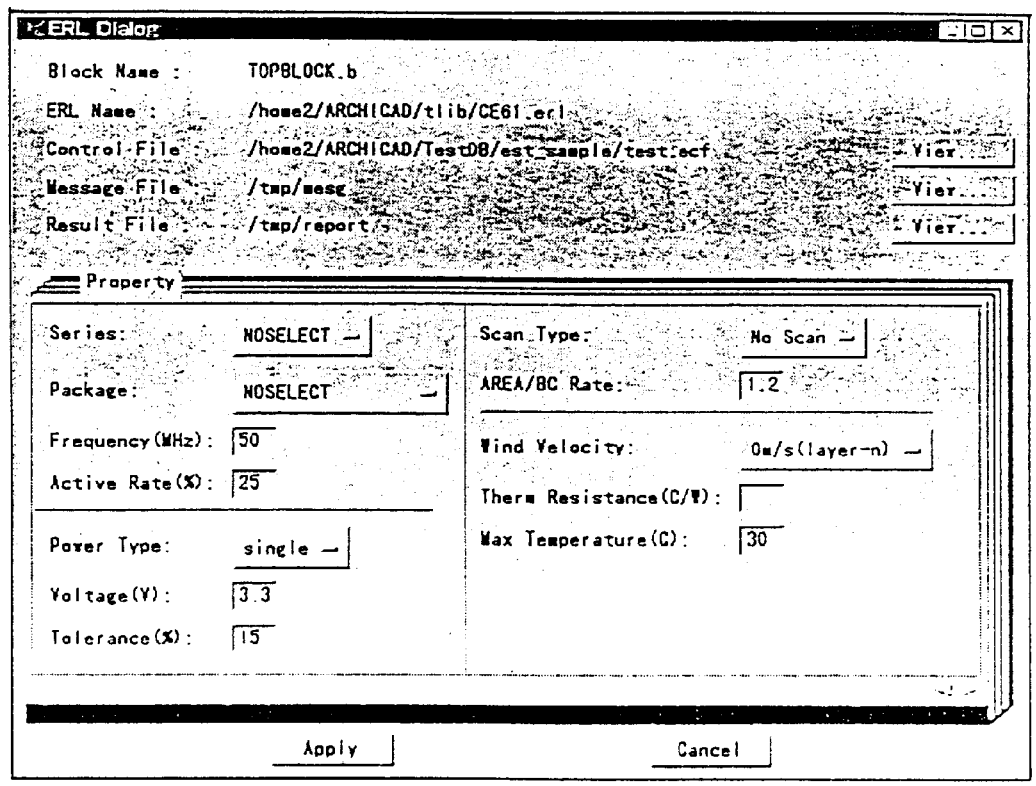
FIG. 27 schematically represents a screen example.

FIG. 27 shows an example of an output screen.

[SYMBOL EDITING FUNCTION]

Next, a description will be made of an editing function of a library-less symbol.

Figure 28:
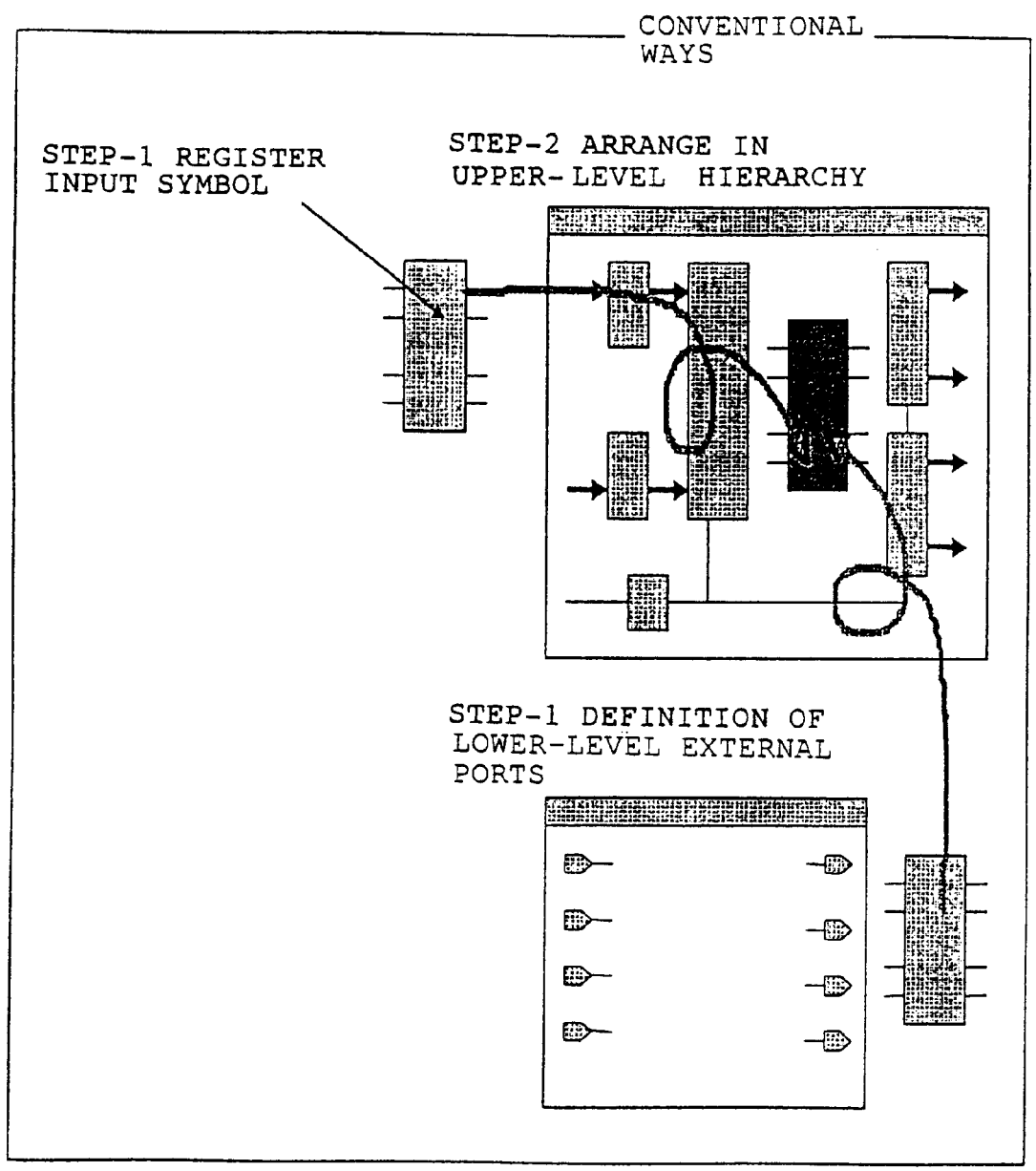
FIG. 28 shows the conventional type entry.

In the conventional entry, as indicated in FIG. 28, before a symbol is inputted, the symbol to be inputted must be formed.

Figure 29:
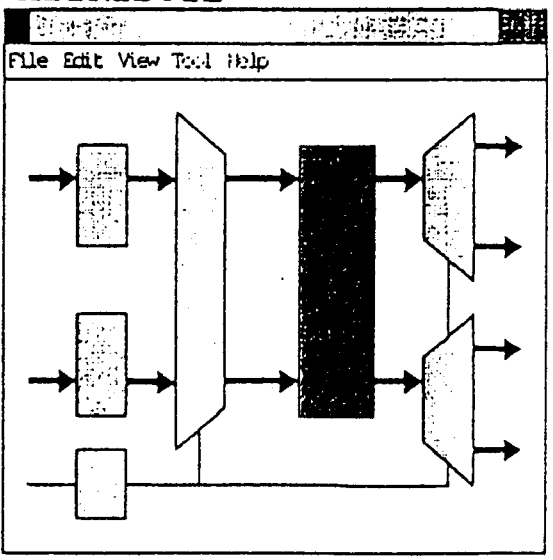
FIG. 29 is a diagram for illustrating an entry in a system according to the present invention.
Figure 30:
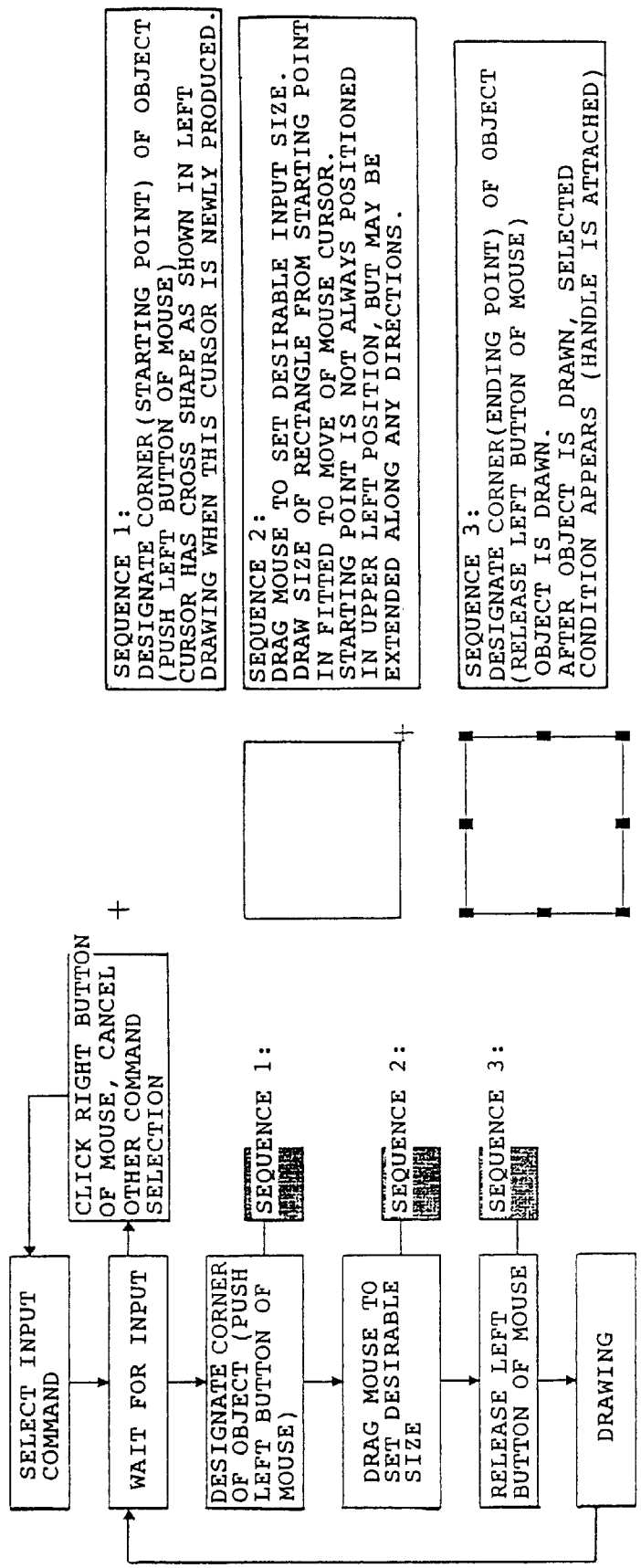
FIG. 30 is a diagram for indicating a symbol input flow.
Figure 31:
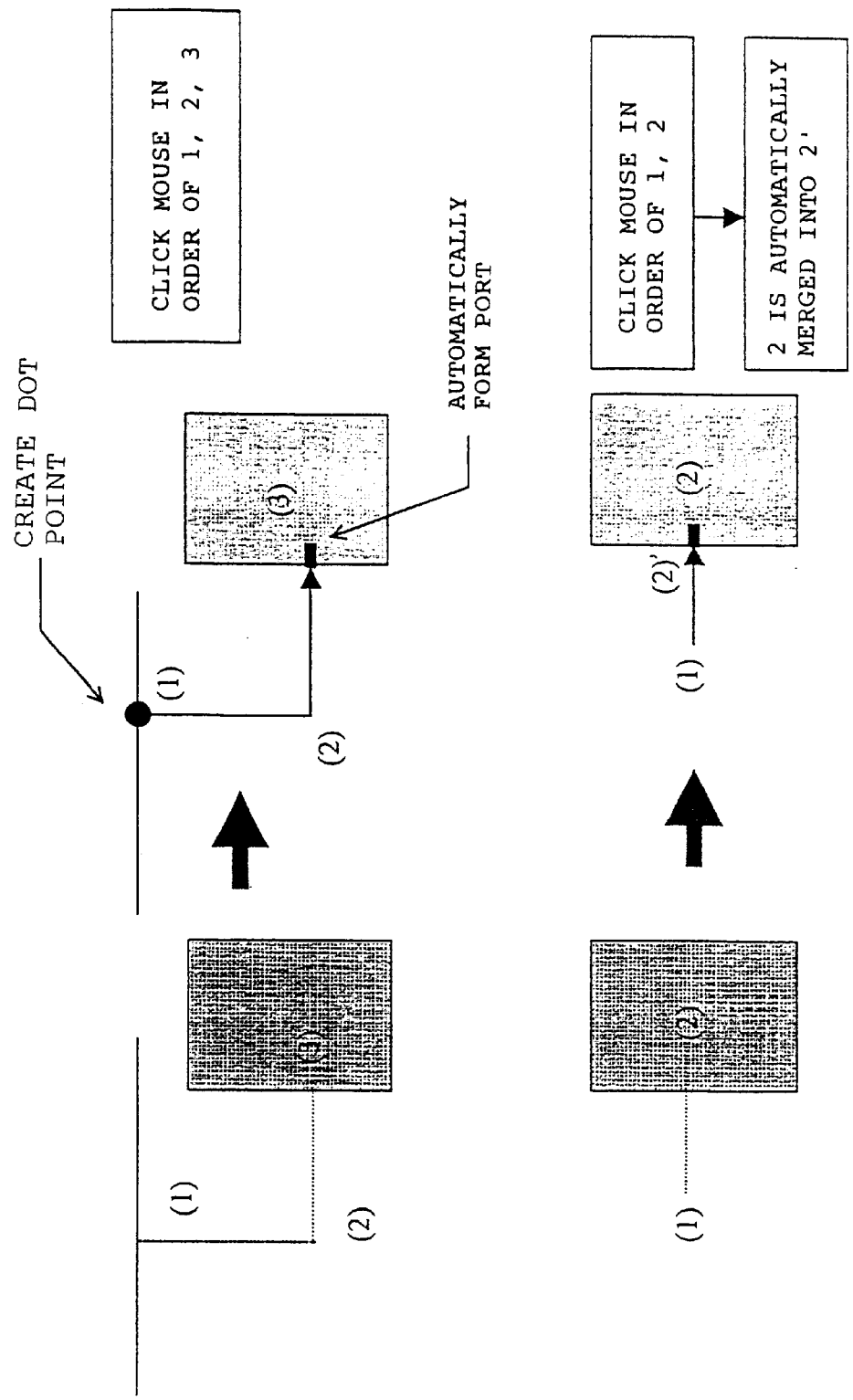
FIG. 31 is a diagram for showing a line input.

To the contrary, in accordance with the system of the present invention, as represented in FIG. 29 to FIG. 31, a symbol having an arbitrary size is formed in a block diagram editing operation. A line is merely connected to an arbitrary place with respect to this symbol, so that PORT is automatically formed.

Now, an input sequence is indicated as follows:

1) A symbol forming function is selected from either a tool bar or menu, and then template menu (rectangle, trapezoid, ALU type, etc.) is displayed. This window is displayed until the window is closed.

2) A desirable shape is selected from the template menu by clicking this desirable shape.

3) A mouse pointer is located at a desirable arranging position. When this mouse pointer is clicked (merely pressed) and then is dragged along a diagonal direction, a symbol-shaped drag is extended.

4) When the mouse button is released, a size is defined, so that a symbol shape can be produced.

It should be understood that the dragging direction of the diagonal line may be freely selected from any of the following directions, i.e., a lower left direction to an upper right direction; the upper right direction to the lower left direction; a lower right direction to an upper left direction; and the upper left direction to the lower right direction.

(1) A symbol input flow is indicated in FIG. 30.

(2) Furthermore, a line input method is shown in FIG. 31.

1) A selection is made of a line input function from either a tool bar or menu.

2) When a starting point is clicked (only pressed), a rubber band starts.

3) When a mouse pointer is moved to an ending point position and then this mouse is released, the line input is completed.

4) When the mouse is subsequently clicked, a bending point is formed.

5) A size/length of an arrow, a width of a line, a sort of the line, a color of the line or the like may be changed by menu.

6) A line may be inputted at a free angle. For default, only a horizontal default, or vertical default is set.

While the shift key is pressed, when the line is inputted, the line can be drawn at free angles.

[INTER-HIERARCHY INTERFACE]

Figure 32:
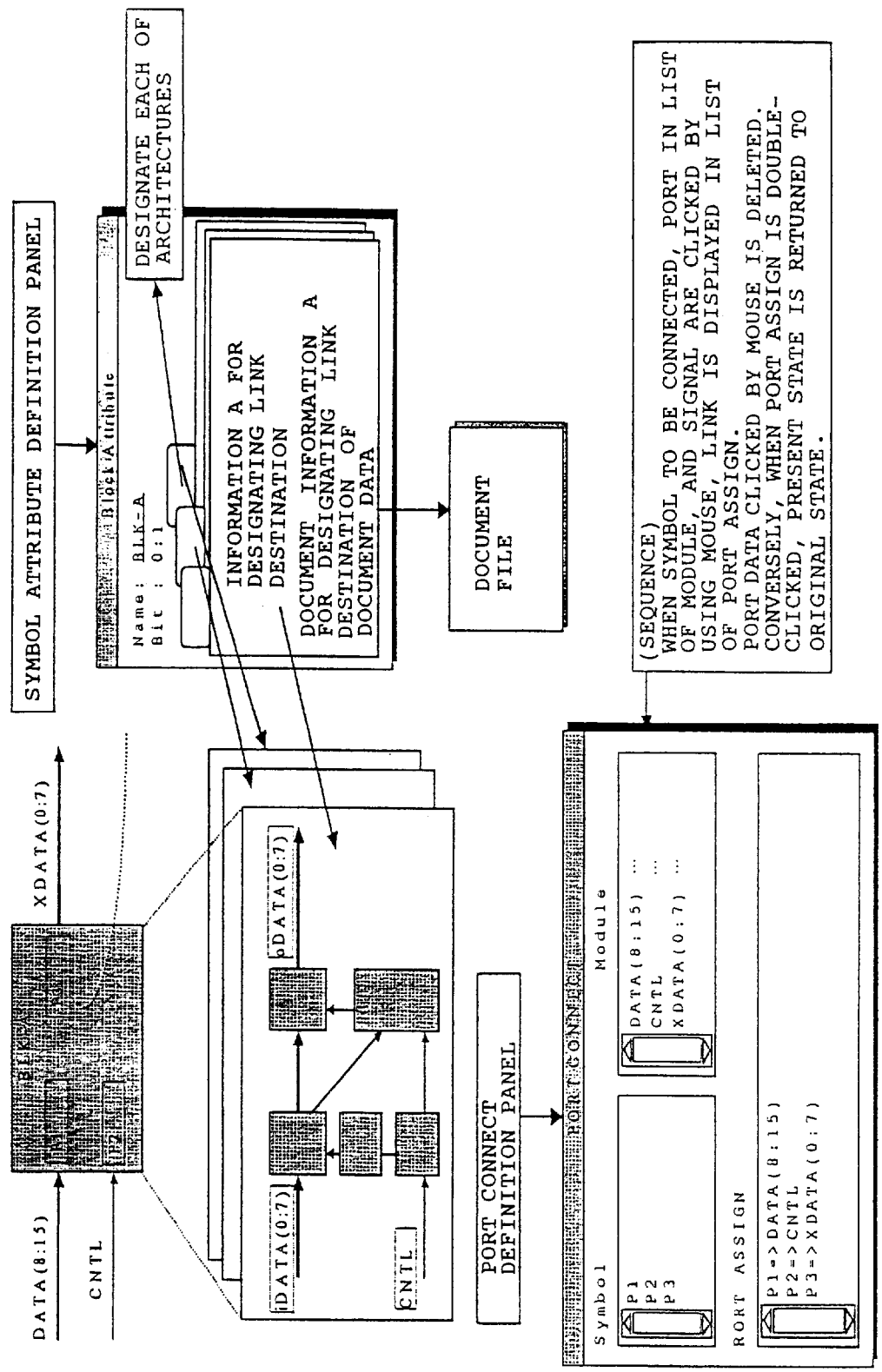
FIG. 32 is a diagram for illustrating an interface among hierarchies.

Next, an inter-hierarchy interface will now be described with reference to FIG. 32.

A hierarchical information definition of a symbol, and a connecting method for connecting a signal with a port of a lower-graded hierarchy own the below-mentioned functions.

A link between a symbol and hierarchical information is carried out on a symbol attribute definition panel. On this definition panel, a plurality of information may be made as a single symbol, depending upon the sort of architecture.

Furthermore, a link of document data related to this symbol may be defined.

A signal coupling between a port of a symbol and a lower-graded hierarchy is carried out on a symbol port connect panel. All of attributes of the connected lower-graded signals are copied to attributes of upper-graded ports.

As a consequence, a content of a block designed in a lower-graded hierarchy is directly reflected onto an upper-graded hierarchy, whereas a content of a block designed in an upper-graded hierarchy is directly reflected onto a lower-graded hierarchy.

[HIERARCHICAL SYMBOL AUTOMATIC FORMING]

Figure 33:
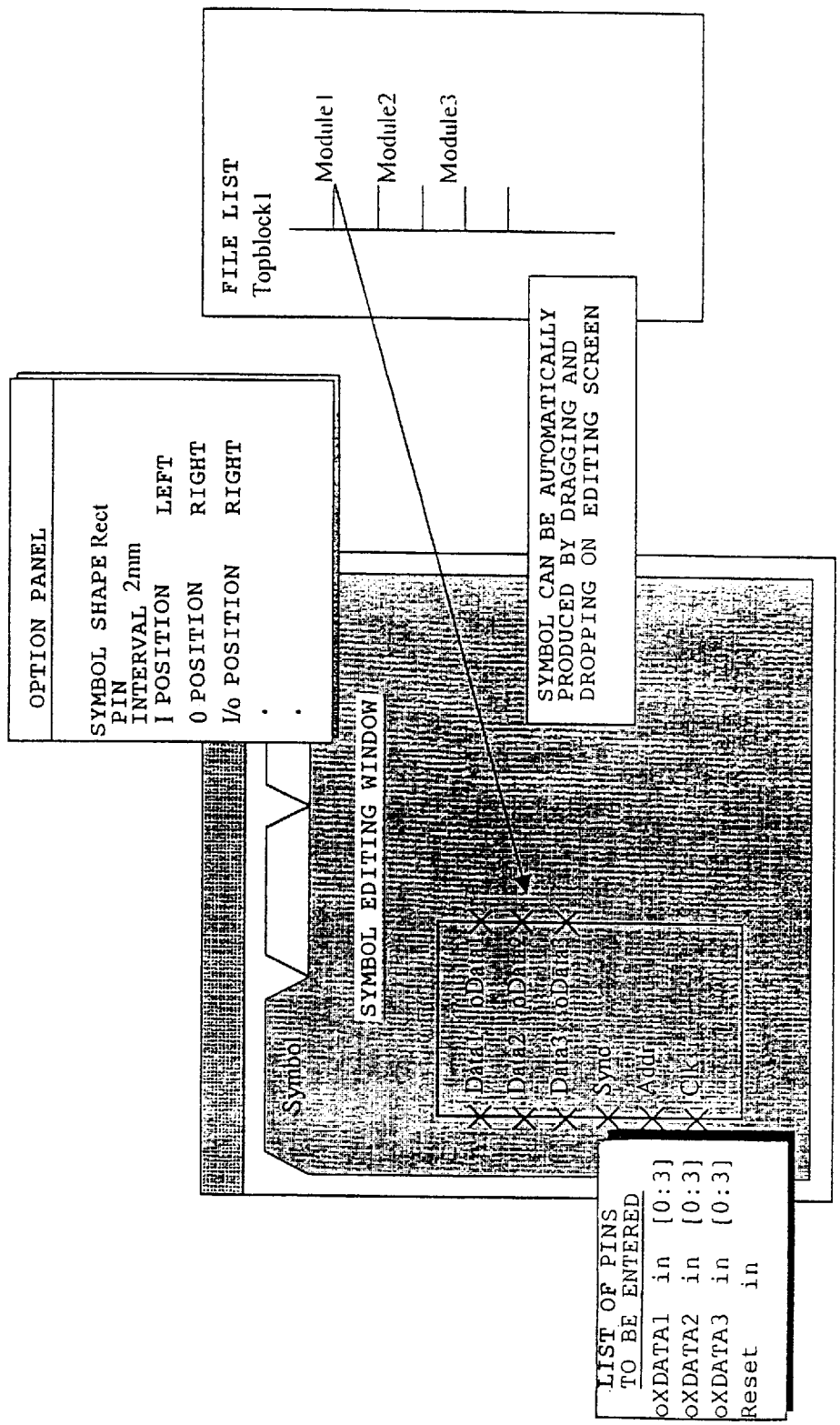
FIG. 33 is a diagram for representing an automatic production of a hierarchical symbol.

Referring now to FIG. 33, a hierarchical symbol automatic forming function will be explained.

This hierarchical symbol automatic forming function is such a function for automatically forming a symbol from an entity description of VHDL, or port information of a block diagram corresponding to a module. The symbol may be formed by dragging and dropping the mouse from the file list to the block diagram or the hierarchical symbol editing window.

Now, functions are represented as follows:

A shape size along a longitudinal direction is determined in fitted to a total number of pins which are arranged on the right/left sides of a symbol. A port name, an I/O sort, a type of a signal, a range of a vector, and an arranging order of ports are employed as information.

A type of a symbol shape, a width of this symbol shape, a position of I/O pin, and an arranging method of pins may be selected from an optional dialogue box. Items are defined as follows:

SYMBOL SHAPE TYPE:

rectangle, trapezoid, etc.

width of shape (selectable in stepwise manner)

ARRANGEMENT OF PINS:

arranging order of pins, how to arrange pins on either right side, or left side of input, output, in/out, respectively.

increment order of port names, decrement order of port names, order described in entity, or arranging order of block diagrams.

(1) Both an arrangement and a sequence will now be explained.

1) As indicated in FIG. 33, the type/width of the symbol shape, the arrangement of the I/O pins, and the arrangement of the pins are set on the option panel.

2) A name of a file to be converted is selected from a file list, or dragged by using a mouse to move this file name to a symbol editing window. When the mouse is released at the symbol editing window, forming of the symbol shape is commenced in accordance with the method registered in the previous paragraph 1).

[HIERARCHY LOADING/SYNTHESIZING FUNCTION]

In accordance with the present invention, in order to accept a function subdivision in a flexible manner, a plurality of function blocks are instructed. As a result, the plural function blocks may be formed as a single hierarchy, and vice versa.

Figure 34:
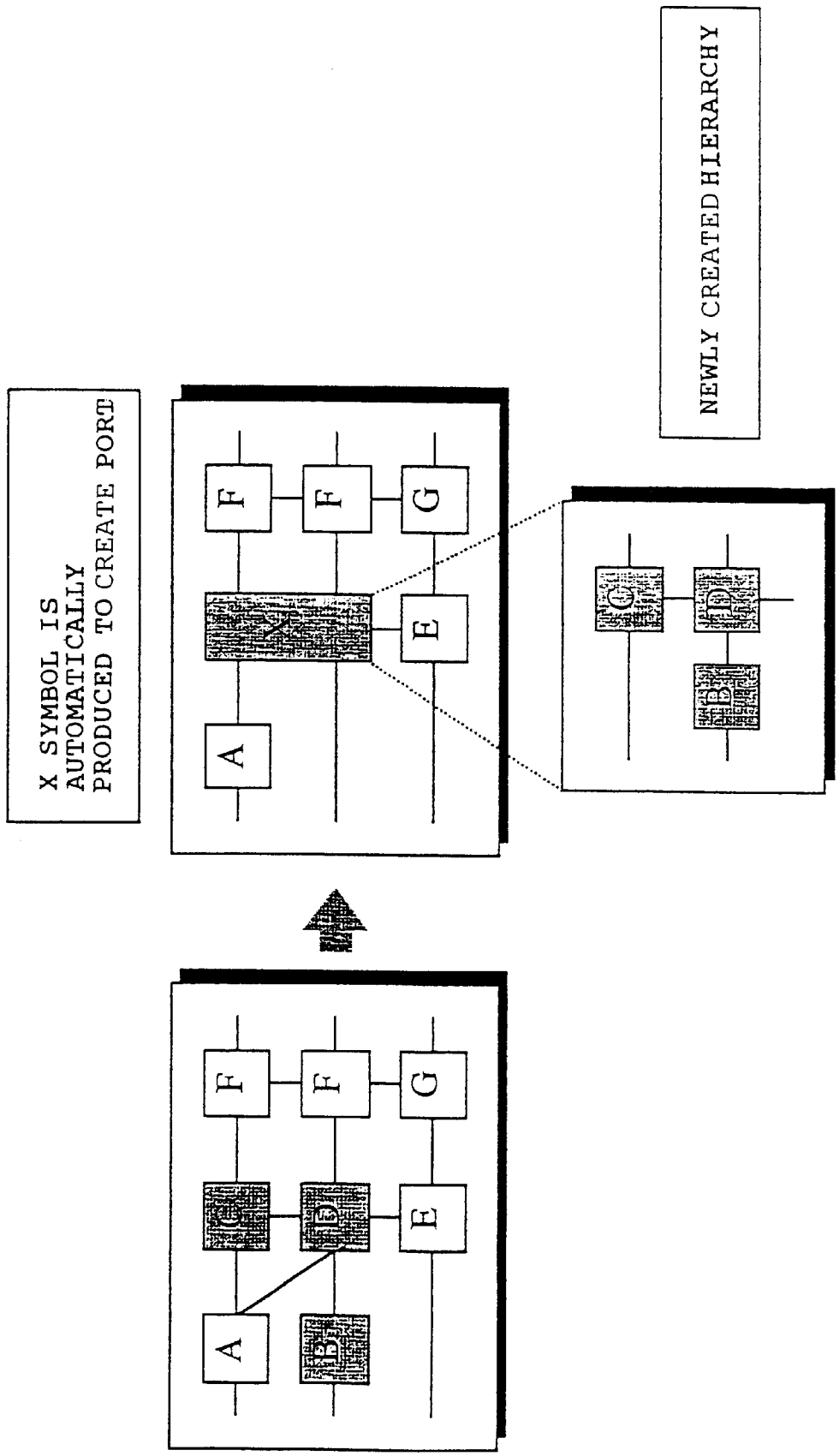
FIG. 34 is a diagram for indicating expanding/synthesizing operations of a hierarchy.

FIG. 34 schematically indicates a structure and a sequence of the above-explained hierarchy loading/synthesizing function.

(SYNTHESIZING PROCESS)

1) A selection is made of a symbol to be synthesized on a block diagram (namely, a range is designated by a mouse, or selected by clicking a mouse).

2) A new hierarchical symbol is formed in the selected symbol group.

3) Port information is formed.

4) A lower-graded symbol is formed.

(LOADING PROCESS)

1) A symbol to be loaded is selected (a plurality of symbols are produced).

2) The loading function is initiated.

3) A lower-graded hierarchy is loaded to be loaded on a block diagram in an upper-graded hierarchy. A symbol (pattern information) is produced.

(LOADING PROCESS)

Conversely, the loading process is performed in such a manner that a content of a lower-graded hierarchy is loaded to an upper-graded hierarchy. In this case, an attention should be paid to duplications of a signal name, and an instance name.

A designation of a property to a symbol may be switched, namely the property designation is set immediately after the shape is defined, or after the shape is defined.

In such a case that a region of a symbol is made in contact with an edge point of a signal, a port is produced.

Figure 35:
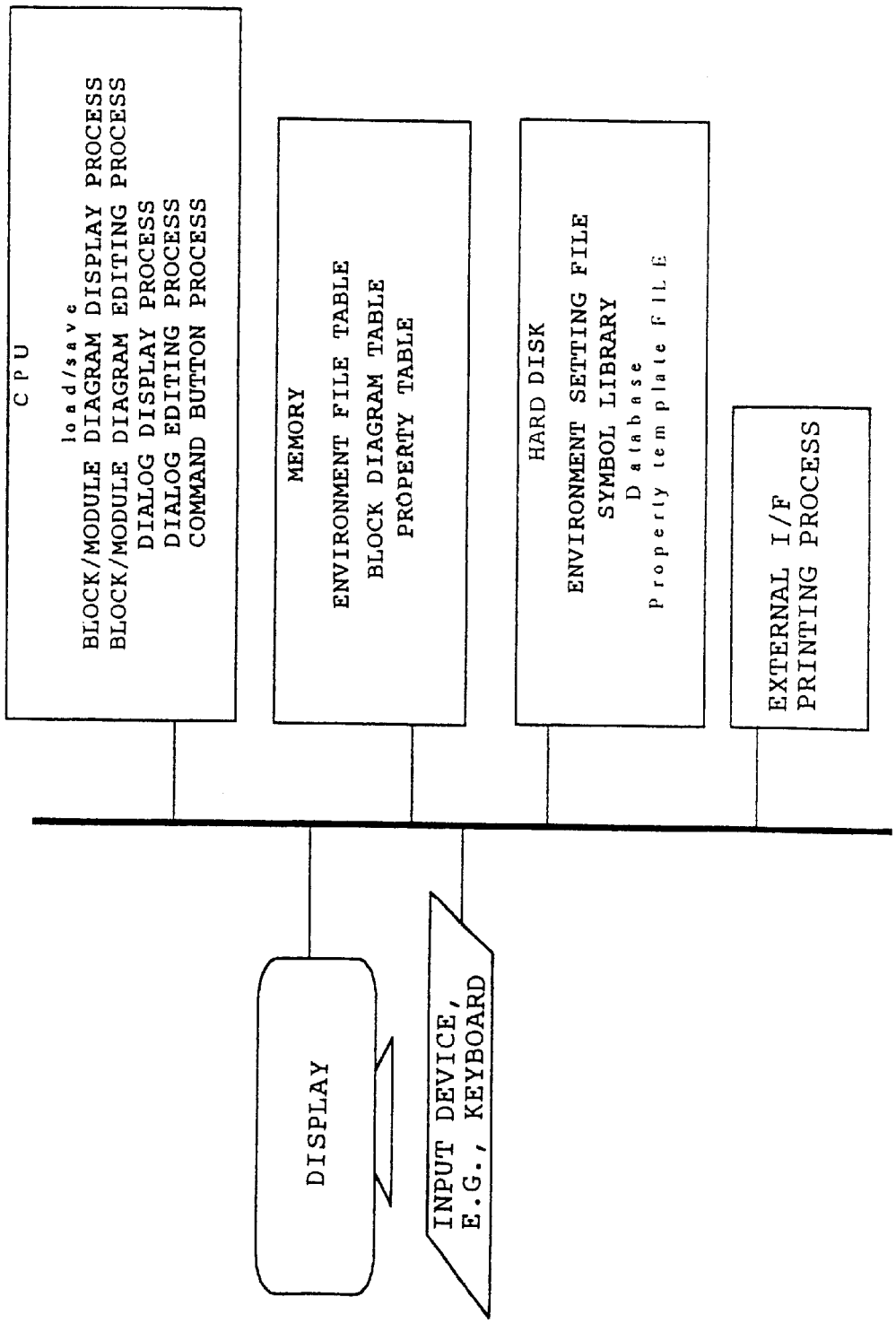
FIG. 35 is a diagram for showing an apparatus structural diagram when the apparatus is accomplished by executing software.
Figure 36:
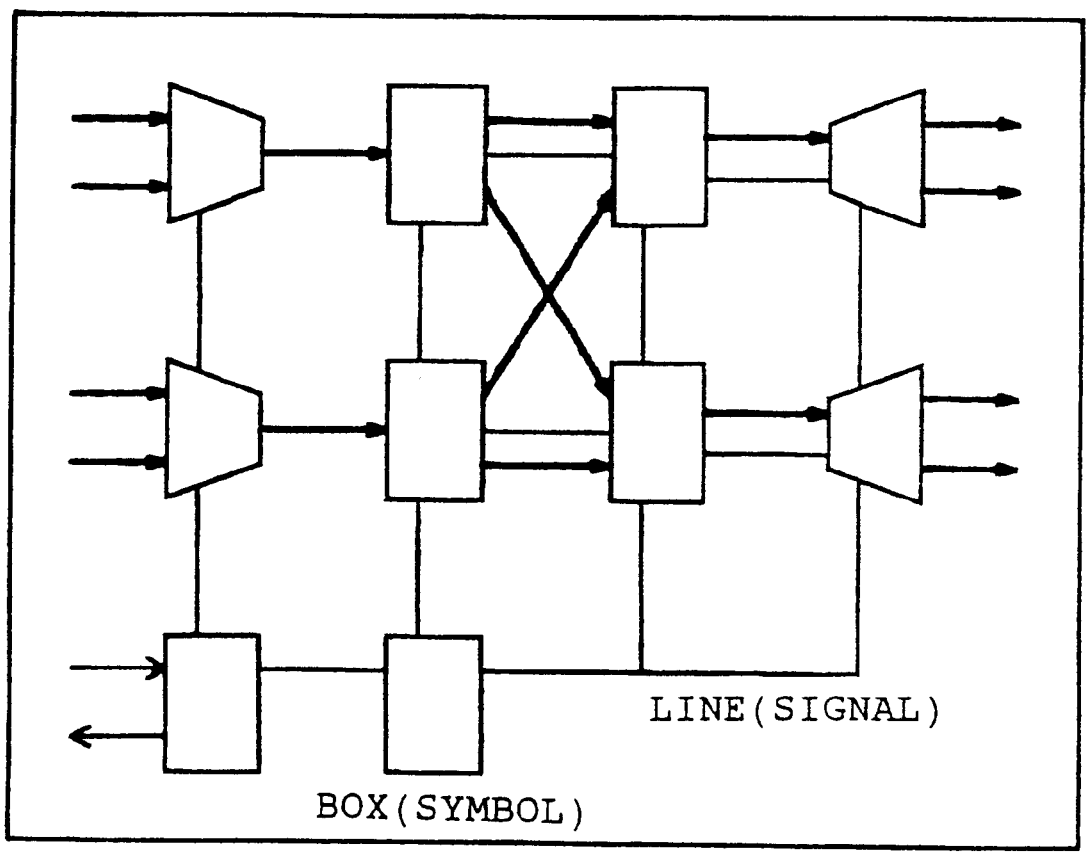
FIG. 36 is a diagram for showing an example of a block diagram.

Next, FIG. 35 illustratively shows an arrangement of the CAD system according to the present invention in such a manner that this CAD system is realized in the form of software executable on a computer such as a workstation and a personal computer. Alternatively, this CAD system may be realized in the form of hardware.

In FIG. 35, a program and design data, by which the CAD system can be realized, are normally stored into a disk. When the program is executed, this program is read into a memory so as to operate a CPU. During the editing process operation, both a block diagram and parameter information are similarly loaded on the memory, and the editing process operation entered from a keyboard and the like and further the representation of these block diagram/parameter information on the display are performed by the program. When the editing process operation is accomplished, the design data is stored into the disk. Also, the estimation/evaluation results are similarly stored into the disk.

An external interface (I/F) is an apparatus connectable with other workstation/personal computer. This external interface (I/F) is not necessarily required in the CAD system of the present invention. While performing a design work by using a plurality of workstations, and a plurality of personal computers, this external interface (I/F) is used to mutually connect these apparatuses.

As previously described in detail, in accordance with the CAD system of the present invention, the realizable estimation is executed in high precision in the upstream stage of the apparatus designing work, namely at the earlier stage of the designing work. As a consequence, the optimum architecture and the optimum apparatus structure can be realized.

Also, the know-how about the designing work and also the estimation process can be saved as the library, so that the estimation precision can be further increased.

Furthermore, the design information entered at the architecture considering stage can be succeeded to the downstream stage. As a result, it is possible to reduce a total number of reentry works and also to avoid the designing mistakes in the downstream stage.

What is claimed is:

1. A system designing/evaluating CAD system for aiding a system design by way of a computer, comprising:

means for editing a block diagram containing symbols representative of an independent function, and lines for connecting these symbols with each other;

means for setting design information to said symbols and said lines in the same formats, respectively;

means for storing thereinto design information in such a data structure that each of said setting design information holds a plurality of detailed level information for each level layer;

means for holding a template used to input estimation parameter information which is applied to one of said symbols and said lines entered by said block editing means; and means for entering the estimation parameter information applied to one of said symbols and said lines from a user while prompting said user to input said estimation parameter information in accordance with said template.

2. A system designing/evaluating CAD system for aiding a system design by way of a computer, comprising:

means for editing a block diagram containing symbols representative of an independent function, and lines for connecting these symbols with each other;

means for setting design information to said symbols and said lines in the same formats, respectively;

means for storing thereinto design information in such a data structure that each of said setting design information holds a plurality of detailed level information for each level layer;

means for linking design information to evaluation result information acquired at a time instant when a design evaluation is carried out in a halfway stage of the system designing work and for automatically storing said linked design information and evaluation result information.

3. A system designing/evaluating CAD system for aiding a system design by way of a computer, comprising:

means for editing a block diagram containing symbols representative of an independent function, and lines for connecting these symbols with each other;

means for setting design information to said symbols and said lines in the same formats, respectively;

means for storing thereinto design information in such a data structure that each of said setting design information holds a plurality of detailed level information for each level layer; and means, in such a case that one block is constituted by a plurality of blocks having more detailed levels while the designing work is performed more in detail, for evaluating overlapped parameter information by utilizing a parameter applied to a more detailed lower-level setting level.

4. A system designing/evaluating CAD system for aiding a system design by way of a computer, comprising means which, when in a block diagram including symbols respectively representing independent functions and lines connecting the symbols, positions for connecting the lines are specified at optional locations of the symbols, automatically creates a signal input port or a signal output port of the symbols;

means for referring to a parameter template owned by each of the symbols and lines and for displaying a parameter setting window based on the parameter template;

means for inputting a parameter which is specific to the symbol and the line when used by the displayed parameter setting window; and means for storing a plurality of pieces of design information, in each design information the symbol and the line are set in the same mode and each design information is stored in such a data structure so as to have a plurality of detailed level information with different abstracts but the same functions according to level layers.

5. A system designing/evaluating CAD system as claimed in claim 4, further comprising:

design information editing means for editing design information while referring to plural level of information for each level layer information having a plurality.

6. A system designing/evaluating CAD system as claimed in claim 4, further comprising:

document data linking means for linking document data to said design information; and document data editing means for editing the document data while the design information is edited.

7. A system designing/evaluating CAD system as claimed in claim 4, further comprising:

means for linking another design information to one symbol to thereby allocate a plurality of hierarchical information to the linked symbol, whereby a plurality of hierarchies are defined to one symbol.

8. A system designing/evaluating CAD system as claim in claim 4, further comprising:

symbol automatic creating means for automatically creating symbol-shaped data by dragging and dropping a symbol forming description language and data of a block diagram on a symbol creating panel.

9. A system designing/evaluating CAD system as claimed in claim 4, further comprising:

hierarchy editing means for designating a plurality of blocks, and for merging said plural blocks into a single hierarchy, or for dividing said single hierarchy into said original plural blocks.

10. A method for aiding a system design by way of a computer using a program storage medium of a system designing /evaluating CAD system, comprising:

editing a block diagram containing symbols representative of an independent function, and lines for connecting these symbols with each other;

setting design information to said symbols and said lines in the same formats, respectively;

storing thereinto design information in such a data structure that each of said setting design information holds a plurality of detailed level information for each level layer;

holding a template used to input estimation parameter information which is applied to one of said symbols and said lines entered by said block editing step; and entering the estimation parameter information applied to one of said symbols and said lines from a user while prompting said user to input said estimation parameter information in accordance with said template.

11. A method for aiding a system design by way of a computer using a program storage medium of a system designing/evaluating CAD system, comprising:

editing a block diagram containing symbols representative of an independent function, and lines for connecting these symbols with each other;

setting design information to said symbols and said lines in the same formats, respectively;

storing thereinto design information in such a data structure that each of said setting design information holds a plurality of detailed level information for each level layer; and linking design information to evaluation result information acquired at a time instant when a design evaluation is carried out in a halfway stage of the system designing work, and for automatically storing said linked design information and evaluation result information.

12. A method for aiding a system design by way of a computer using a program storage medium of a system designing/evaluating CAD system, comprising:

editing a block diagram containing symbols representative of an independent function, and lines for connecting these symbols with each other;

setting design information to said symbols and said lines in the same formats, respectively;

storing thereinto design information in such a data structure that each of said setting design information holds a plurality of detailed level information for each level layer; and in such a case that one block is constituted by a plurality of blocks having more detailed levels while the designing work is performed more in detail, evaluating overlapped parameter information by utilizing a parameter applied to a more detailed lower-level setting level.

13. A method for aiding a system design by way of a computer using a program storage medium of a system designing/evaluating CAD system, comprising:

automatically creating a signal input port or a signal output port of the symbols, when in a block diagram including symbols respectively representing independent functions and lines connecting the symbols, positions for connecting the lines are specified at optional locations of the symbols;

referring to a parameter template owned by each of the symbols and lines and displaying a parameter setting window based on the parameter template;

inputting a parameter which is specific to the symbol and the line when used by the displayed parameter setting window; and storing a plurality of pieces of design information, in each design information the symbol and the line are set in the same mode and each design information is stored in such a data structure so as to have a plurality of detailed level information with different abstracts but the same functions according to level layers.

* * * * *